US011240954B2

(12) United States Patent
Pidwerbesky et al.

(10) Patent No.: US 11,240,954 B2
(45) Date of Patent: Feb. 8, 2022

(54) AGRICULTURAL AGITATING AND LEVELING SYSTEM

(71) Applicant: CNH Industrial Canada, Ltd., Saskatoon (CA)

(72) Inventors: Jesse Blair Pidwerbesky, Warman (CA); Graham Douglas Stuart, Warman (CA); Nicholas George Alfred Ryder, Saskatoon (CA); Paul David Minto, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 442 days.

(21) Appl. No.: 16/265,055

(22) Filed: Feb. 1, 2019

(65) Prior Publication Data
US 2020/0245534 A1 Aug. 6, 2020

(51) Int. Cl.
| | | |
|---|---|---|
| *A01C 15/00* | (2006.01) | |
| *B01F 7/00* | (2006.01) | |
| *B01F 7/08* | (2006.01) | |
| *B01F 15/00* | (2006.01) | |
| *A01C 7/04* | (2006.01) | |

(52) U.S. Cl.
CPC ........ *A01C 15/005* (2013.01); *B01F 7/00433* (2013.01); *B01F 7/00633* (2013.01); *B01F 7/08* (2013.01); *B01F 15/00155* (2013.01); *B01F 15/00253* (2013.01); *A01C 7/04* (2013.01); *B01F 2015/00642* (2013.01); *B01F 2215/0013* (2013.01)

(58) Field of Classification Search
CPC ......... A01C 15/005; A01C 7/04; A01C 7/105; A01C 19/02; A01C 15/007; A01C 7/081; B01F 7/00433; B01F 7/00633; B01F 7/08; B01F 15/00155; B01F 15/00253; B01F 2215/0013; B01F 2015/00642; B01F 7/00258; B01F 7/0065; B01F 15/00194; B01F 15/0035
USPC ........................................ 366/152.6, 153.1
See application file for complete search history.

(56) References Cited

U.S. PATENT DOCUMENTS

| | | | | |
|---|---|---|---|---|
| 3,897,235 | A | * 7/1975 | Wilson | B01F 7/024 65/335 |
| 3,964,620 | A | * 6/1976 | Parsons | B65D 90/48 414/289 |
| 3,991,668 | A | * 11/1976 | De Milt | B30B 9/3007 100/98 R |
| 4,561,781 | A | 12/1985 | Seymour | |
| 4,715,012 | A | 12/1987 | Mueller, Jr. | |

(Continued)

*Primary Examiner* — Tony G Soohoo
(74) *Attorney, Agent, or Firm* — Rebecca L. Henkel; Rickard K. DeMille

(57) ABSTRACT

A particulate material sensing and agitation control system of an agricultural system having a drive system configured to operate an agitating system, and a controller having a memory and a processor. The controller is configured to receive at least one sensor signal indicative of a profile of a particulate material within the agricultural system, and output a control signal to instruct the drive system to operate the agitating system in a selected operating mode of a plurality of operating modes based on the profile of the particulate material. The agitating system is configured to interact with the particulate material in each operating mode of the plurality of operating modes, and the plurality of operating modes includes an agitation mode and a leveling mode.

20 Claims, 11 Drawing Sheets

(56) References Cited

U.S. PATENT DOCUMENTS

| | | | |
|---|---|---|---|
| 5,524,796 A * | 6/1996 | Hyer | B65G 33/18 198/662 |
| 6,073,428 A | 6/2000 | Diekhans | |
| 6,332,739 B1 * | 12/2001 | Sakai | A21C 9/04 222/368 |
| 6,397,571 B1 | 6/2002 | Ehrecke | |
| 6,655,351 B2 | 12/2003 | Sheidler et al. | |
| 6,761,284 B2 * | 7/2004 | Knepler | B67D 1/0871 222/129.4 |
| 6,948,535 B2 * | 9/2005 | Stegemoeller | B65G 65/46 141/67 |
| 7,110,924 B2 | 9/2006 | Prewett et al. | |
| 7,377,103 B2 | 5/2008 | Yu et al. | |
| 7,712,321 B2 * | 5/2010 | Kadyk | A23G 9/12 62/136 |
| 7,779,616 B2 | 8/2010 | Sheidler et al. | |
| 7,945,378 B2 | 5/2011 | Sheidler et al. | |
| 8,201,708 B2 * | 6/2012 | Adelmann | H05B 3/60 222/54 |
| 8,408,382 B2 * | 4/2013 | Pano | A47J 31/404 198/550.1 |
| 8,662,972 B2 * | 3/2014 | Behnke | B65G 67/22 460/119 |
| 9,126,352 B2 * | 9/2015 | O'Callaghan | B01F 15/067 |
| 9,346,464 B2 | 5/2016 | Gilbert et al. | |
| 9,421,863 B2 | 8/2016 | Ruokola | |
| 9,488,119 B2 | 11/2016 | Frelich | |
| 9,751,058 B2 | 9/2017 | Bedord et al. | |
| 9,868,096 B2 * | 1/2018 | O'Callaghan | F26B 3/06 |
| 9,903,299 B2 | 2/2018 | Homant et al. | |
| 10,259,140 B1 * | 4/2019 | Derose | B28C 5/1246 |
| 10,543,620 B1 * | 1/2020 | Derose | B01F 13/0033 |
| 10,687,460 B2 * | 6/2020 | Roberge | B01F 13/0294 |
| 10,986,773 B2 * | 4/2021 | Thompson | A01B 79/005 |
| 2013/0037566 A1 * | 2/2013 | Bohm | G01F 23/226 222/51 |
| 2018/0022337 A1 | 1/2018 | Burjes | |
| 2019/0230848 A1 * | 8/2019 | Forrest | B01F 15/0035 |
| 2020/0025782 A1 * | 1/2020 | Ahlfors | B01L 1/04 |
| 2020/0029500 A1 * | 1/2020 | Lacy | A01D 41/141 |
| 2020/0245534 A1 * | 8/2020 | Pidwerbesky | B01F 15/00194 |
| 2020/0245535 A1 * | 8/2020 | Schilling | A01C 15/007 |
| 2020/0245536 A1 * | 8/2020 | Erker | B01F 15/00201 |
| 2020/0245539 A1 * | 8/2020 | Stuart | B01F 15/00311 |
| 2020/0245541 A1 * | 8/2020 | Stuart | B01F 15/00155 |
| 2020/0245542 A1 * | 8/2020 | Stuart | B01F 7/08 |
| 2020/0245543 A1 * | 8/2020 | Collins | B01F 15/00194 |
| 2020/0245544 A1 * | 8/2020 | Erker | B01F 7/00408 |

* cited by examiner

US 11,240,954 B2

AGRICULTURAL AGITATING AND LEVELING SYSTEM

BACKGROUND

The present disclosure relates generally to an agitating and leveling system for an agricultural system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, agricultural seeding implements are towed behind a work vehicle, such as a tractor. These implements may contain a particulate material, such as seeds, fertilizer, and/or other agricultural product, which is distributed on or in the ground using various methods. Certain implementations include a storage tank in which the particulate material is stored and a metering system configured to meter the particulate material from the storage tank. The particulate material is distributed from the metering system to row units, which are configured to distribute the particulate material on or in the ground.

As the storage tank is filled with the particulate material and/or while the particulate material flows from the storage tank to the metering system, the particulate material may create an undesirable profile within the storage tank. Several factors may contribute to this undesirable profile, including, but not limited to, friction between the particulate material and the storage tank, clumping of the particulate material, operation of the implement on a slope, and an inactive portion or inactive portions of the metering system. This undesirable profile may lead to uneven flow to the metering system, which may cause an unwanted distribution or no distribution of the particulate material over and/or within certain regions of a field. As a result, the crop yield within these regions may be reduced, thereby reducing the efficiency of the seeding process.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a particulate material sensing and agitation control system of an agricultural system includes a drive system configured to operate an agitating system, and a plurality of sensors, in which each sensor of the plurality of sensors is configured to detect presence of particulate material at the sensor. The particulate material sensing and agitation control system further includes a controller having a memory and a processor, in which the controller is configured to determine a functional status of each sensor of the plurality of sensors, and, in response to determining the functional status of a respective sensor of the plurality of sensors is functioning, determine a detection status of the respective sensor. The controller is also configured to output a control signal to instruct the drive system to operate the agitating system in a selected operating mode of a plurality of operating modes based on a position within the agricultural system, the functional status, and the detection status of each sensor of the plurality of sensors.

DRAWINGS

These and other features, aspects, and advantages of the present disclosure will become better understood when the following detailed description is read with reference to the accompanying drawings in which like characters represent like parts throughout the drawings, wherein.

Figure 10:
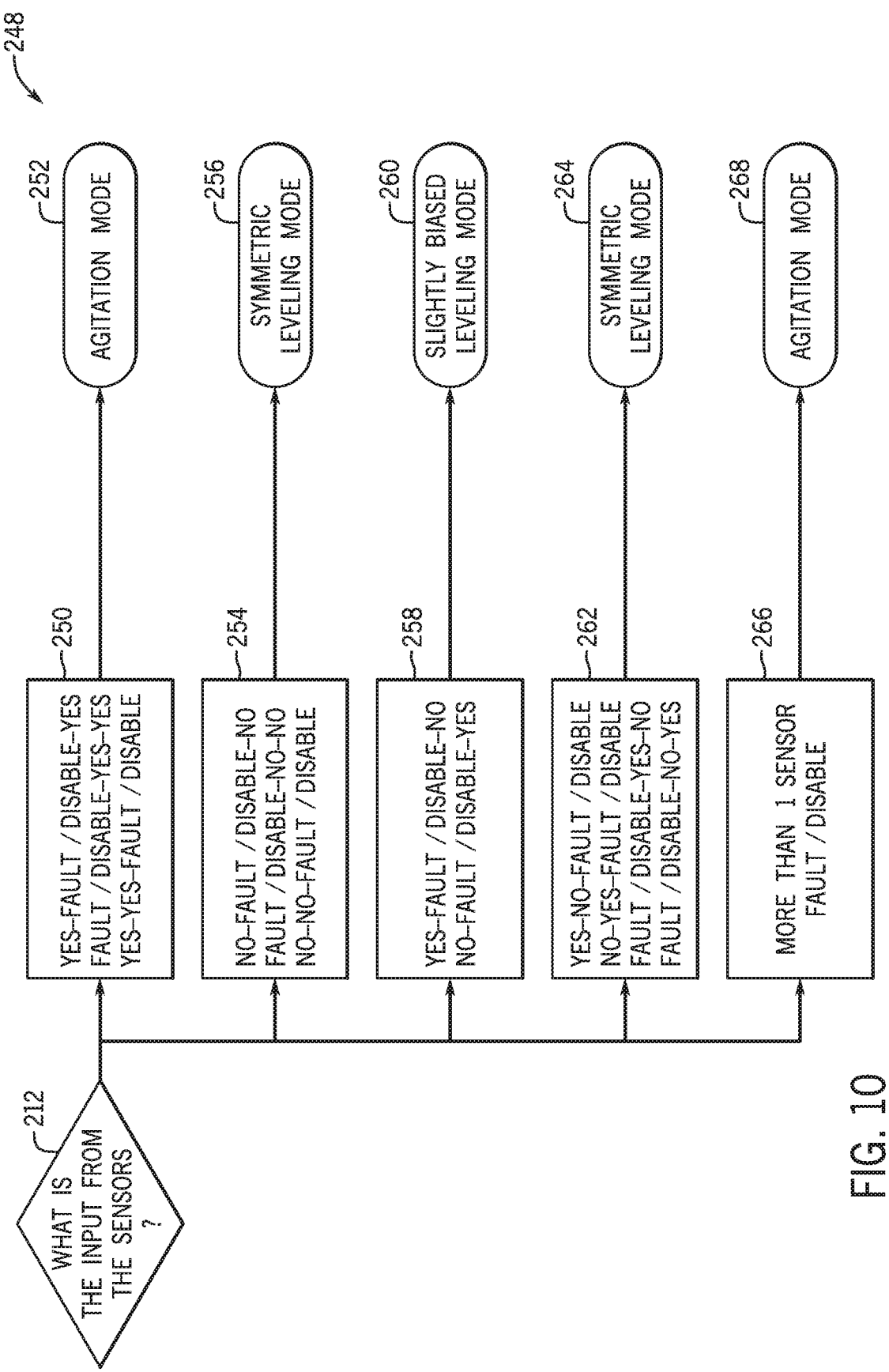
Figure 11:
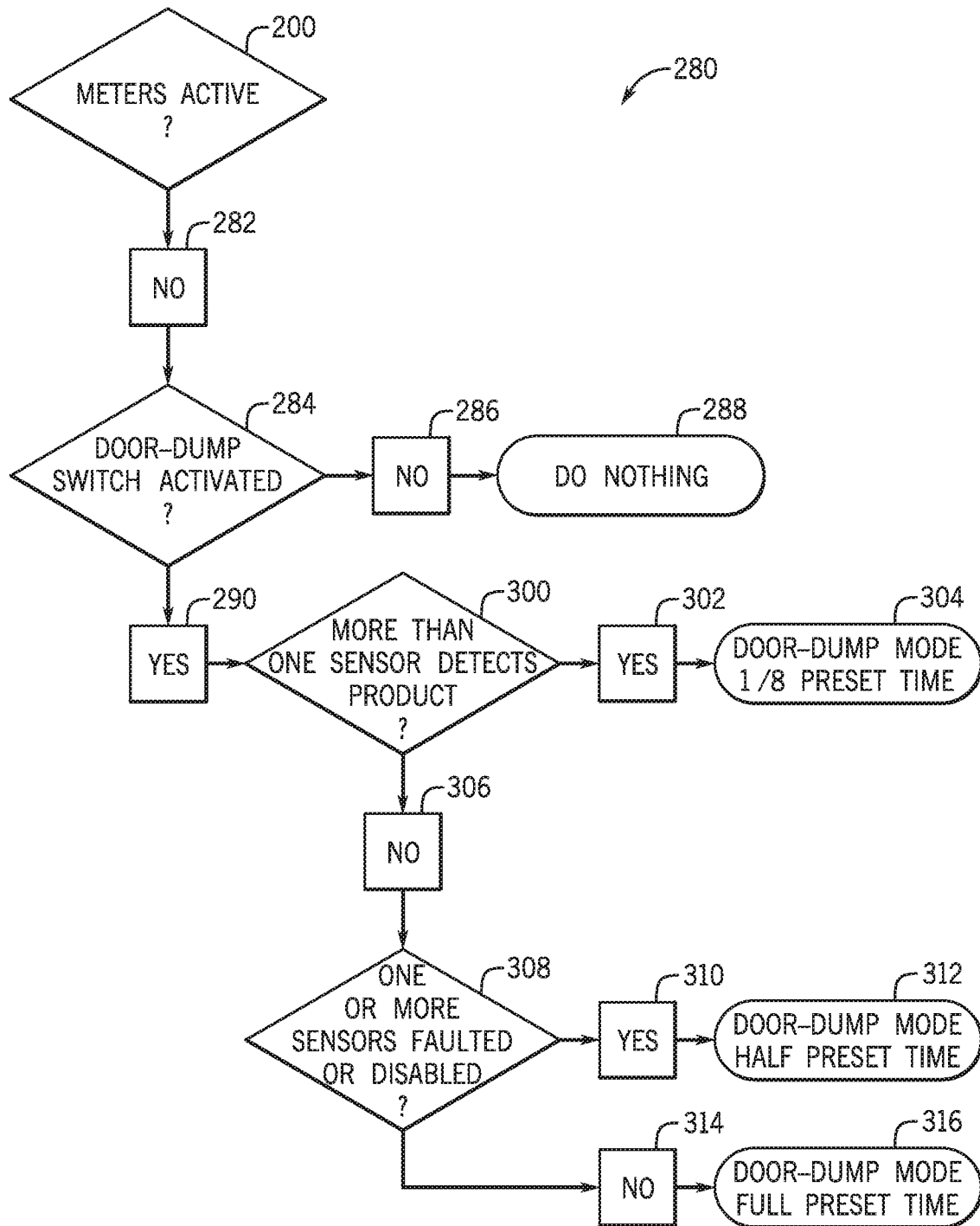

FIG. 10 is a flowchart of an embodiment of a method to control a particulate material sensing and agitation control system while the particulate material sensing and agitation control system is metering particulate material and not all sensors of the particulate material sensing and agitation control system are functioning, in accordance with an aspect of the present disclosure; and FIG. 11 is a flowchart of an embodiment of a method to control a particulate material sensing and agitation control system to operate in a door-dump mode while the particulate material sensing and agitation control system is not metering particulate material, in accordance with an aspect of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure relate to agricultural systems having a particulate material sensing and agitation control system. Certain agricultural systems (e.g., air carts, implements, etc.) contain a particulate material (e.g., seeds, fertilizer, and/or other agricultural products) within a storage tank of the agricultural system. The agricultural system is configured to distribute the particulate material within a field. The particulate material may flow from the storage tank through a metering system, which is configured to control the flow of the particulate material to the field. As the storage tank is filled with the particulate material and/or as the particulate material flows from the storage tank through the metering system, the profile of the particulate material within the storage tank may change, which may affect a manner in which the particulate material moves through the metering system. For example, the profile of the particulate material may reduce a flow rate of particulate material through the metering system. As such, the distribution of the particulate material within the field may be limited or undesirable.

Accordingly, the agricultural system may include a particulate material sensing and agitation control system configured to monitor the profile of the particulate material and adjust the profile of the particulate material. As an example, the particulate material sensing and agitation control system may agitate the particulate material to induce movement of the particulate material through the metering system. Additionally or alternatively, the particulate material sensing and agitation control system may be configured to drive a portion of the particulate material toward one side to create a desirable profile of the particulate material. As such, the particulate material sensing and agitation control system may maintain a flow rate of particulate material through the metering system to maintain a desirable distribution of particulate material onto the field.

In some embodiments, the particulate material sensing and agitation control system may be configured to operate in different operating modes based on the profile of the particulate material. In one example, the particulate material sensing and agitation control system may be configured to operate in a symmetric mode configured to maintain the profile of the particulate material. In another example, the particulate material sensing and agitation control system may be configured to operate in a biasing mode configured to drive the particulate material toward one side. Further still, the particulate material sensing and agitation control system may be configured to operate in a door-dump mode to distribute particulate material throughout a storage tank while particulate material is loaded or after particulate material has been loaded into the storage tank via a door of the storage tank.

The particulate material sensing and agitation control system described herein may be installed in both new and existing agricultural systems. The particulate material sensing and agitation control system may include one or more sensors configured to detect the profile of the particulate material. Furthermore, the particulate material sensing and agitation control system may include a controller and an agitating system. In certain embodiments, the controller may be communicatively coupled to both the sensor(s) and the agitating system. Thus, based on feedback from the sensor (s), the controller may operate the agitating system in a mode determined based on sensor feedback, in which the agitation system is controlled based on the mode.

Figure 1:
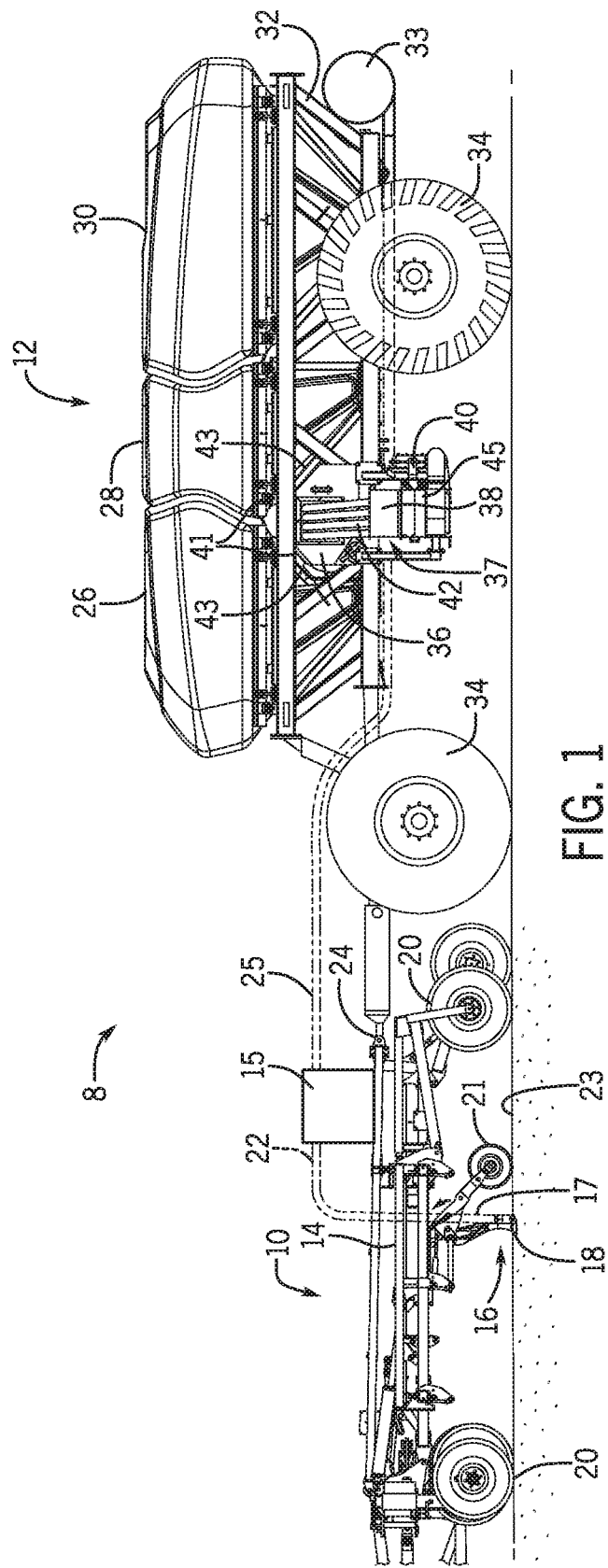
FIG. 1 is a side view of an embodiment of an agricultural system having an agricultural implement coupled to an air cart, in accordance with an aspect of the present disclosure.

With the foregoing in mind, the present embodiments relating to particulate material sensing and agitation control systems may be utilized within any suitable agricultural system. To help illustrate, FIG. 1 is a side view of an embodiment of an agricultural system 8 having an agricultural implement 10 coupled to an air cart 12. As depicted, the agricultural implement 10 includes a tool frame 14 coupled to a header 15, a row unit 16 having a particulate material tube 17 and an opener 18, and wheel assemblies 20. The agricultural implement 10 may be pulled by a work vehicle (e.g., a tractor) to deposit rows of particulate material (e.g., agricultural product) within the soil. Accordingly, the wheel assemblies 20 may contact the soil surface to enable the agricultural implement 10 to be pulled by the work vehicle. As the agricultural implement 10 is pulled, a row of the particulate material may be deposited in the soil by the row unit 16 (e.g., ground engaging opener assembly). Although only one row unit 16 is shown, the agricultural implement 10 may include multiple row units 16 (e.g., organized in a row across the agricultural implement 10). In some embodiments, the agricultural implement 10 may include a row of 12, 14, 16, 18, 20, or more row units 16, which may each deposit a respective row of particulate material into the soil.

To facilitate depositing the particulate material, each row unit 16 (e.g., ground engaging opener assembly) may include a press wheel 21. While the opener 18 engages the soil 23, the opener 18 exerts a force that excavates a trench into the soil 23 as the row unit 16 travels across the soil 23. The particulate material may be deposited into the excavated trench via the particulate material tube 17. Then, the press wheel 21 may pack soil onto the deposited particulate material. In certain embodiments, the press wheel may not directly be a part of the row unit. Instead, for example, at least one press wheel may be mounted to the frame of the implement behind the at least one row unit. Furthermore, while the illustrated row unit includes a ground engaging opener assembly, in alternative embodiments, at least one row unit on the implement may include an applicator assembly configured to deposit particulate material onto the surface of the field, or any other suitable type of product deposition assembly.

The header 15 may provide the particulate material to the row units 16. In some embodiments, the header 15 may pneumatically distribute the particulate material from a primary line to secondary lines. In the illustrated embodiment, a primary line 25 directs particulate material from the air cart 12 to the header 15. Additionally, the header 15 is configured to distribute the particulate material to the row units 16 via respective secondary lines 22. In certain embodiments, multiple primary lines may direct particulate material to multiple headers. Moreover, multiple secondary lines may extend from each header to respective row units. Furthermore, in certain embodiments, at least one secondary line may extend to a secondary header, and multiple tertiary lines may extend from the secondary header to respective row units.

In the depicted embodiment, the air cart 12 is towed behind the agricultural implement 10. For example, the agricultural implement 10 may be coupled to the work vehicle by a first hitch assembly, and the air cart 12 may be coupled to the agricultural implement 10 by a second hitch assembly 24. However, in other embodiments, the agricultural implement may be towed behind the air cart. In further embodiments, the agricultural implement and the air cart may be part of a single unit that is towed behind the work vehicle, or may be elements of a self-propelled vehicle.

The air cart 12 may centrally store particulate material and distribute the particulate material to the header 15. Accordingly, as depicted, the air cart 12 includes three primary storage tanks 26, 28, and 30, an air cart frame 32, an air source 33, and wheels 34. Further, the air cart 12 includes an auxiliary or secondary storage tank 36, a fill hopper 38, an air supply 40, and product conveyance conduits 42. The second hitch assembly 24 is coupled between the tool frame 14 and the air cart frame 32, which enables the air cart 12 to be towed with the agricultural implement 10. Further, the fill hopper 38 enables an operator to fill the secondary storage tank 36. Accordingly, the fill hopper 38 is located on a side of the air cart 12 and at a level above the soil 23 that facilitates access by the operator (e.g., from ground level or from a bed of a truck). For example, an opening of the fill hopper 38, which receives the particulate material, may be located less than 5 feet (1.5 meters) above the ground. At this height, the operator may load the fill hopper 38 from ground level or from a truck bed, for example. The secondary storage tank 36 may be loaded by another suitable system in addition to or instead of via the fill hopper, air supply 40, and product conveyance conduits 42. For example, the secondary storage tank 36 may include a door as described below that may be opened by the operator to load the secondary storage tank 36 directly with particulate material.

Additionally, the agricultural system 8 may include a particulate material sensing and agitation control system 37 to control movement of the particulate material within a storage tank. For purposes of discussion, this disclosure primarily refers to the particulate material sensing and agitation control system 37 as being located in the secondary storage tank 36 to control movement of the particulate material in the secondary storage tank 36. However, a particulate material sensing and agitation control system may be located in at least one of the primary storage tanks 26, 28, 30 (e.g., in addition to or instead of the particulate material sensing and agitation control system in the secondary storage tank) to control movement of the particulate material in the primary storage tank(s).

The primary storage tanks 26, 28, and 30, and the secondary storage tank 36 may store the particulate material (e.g., seeds, granular fertilizer, granular inoculants, etc.). In some embodiments, the primary storage tanks 26, 28, and 30 may each include a single large storage compartment for storing a single agricultural product. In certain embodiments, the primary storage tanks may each store a different agricultural product. For example, the first primary storage tank 26 may store legume seeds, and the second primary storage tank 28 may store a dry fertilizer. Additionally, in this example, the secondary storage tank 36 may store granular inoculants, which are planted in conjunction with the legume seeds. In such configurations, the air cart 12 may deliver seed, fertilizer, and inoculant to the agricultural implement 10 via separate primary lines, or as a mixture through a single primary line.

Further, as illustrated, the secondary storage tank 36 is positioned beneath portions of the primary storage tanks 26 and 28. To improve storage capacity of the secondary storage tank 36, upper walls 41 of the secondary storage tank 36 have slopes that substantially correspond to respective slopes of bottom portions 43 of the primary storage tanks 26 and 28. Therefore, the shape of the secondary storage tank 36 enables the secondary storage tank 36 to utilize a substantial portion of the space between the primary storage tanks 26 and 28. Similarly, in an alternative embodiment, the secondary storage tank may be positioned between the primary storage tanks 28 and 30.

The particulate material may be fed from the secondary storage tank 36 through the particulate material sensing and agitation control system 37 into a metering system 45, which meters the particulate material, fluidizes the particulate material via a fluidizing airflow from the air source 33, and distributes the particulate material to the header 15 via the primary line 25. In some embodiments, the air source 33 may be one or more pumps and/or blowers powered by electric or hydraulic motor(s), for example. The particulate material sensing and agitation control system 37 may be positioned at the bottom of the secondary storage tank 36 and above the metering system 45, and may be configured to facilitate movement of the particulate material into the metering system 45 from the secondary storage tank 36. For example, the particulate material sensing and agitation control system 37 may break up clumped sections of particulate material to enable the particulate material to flow to the metering system 45.

Figure 2:
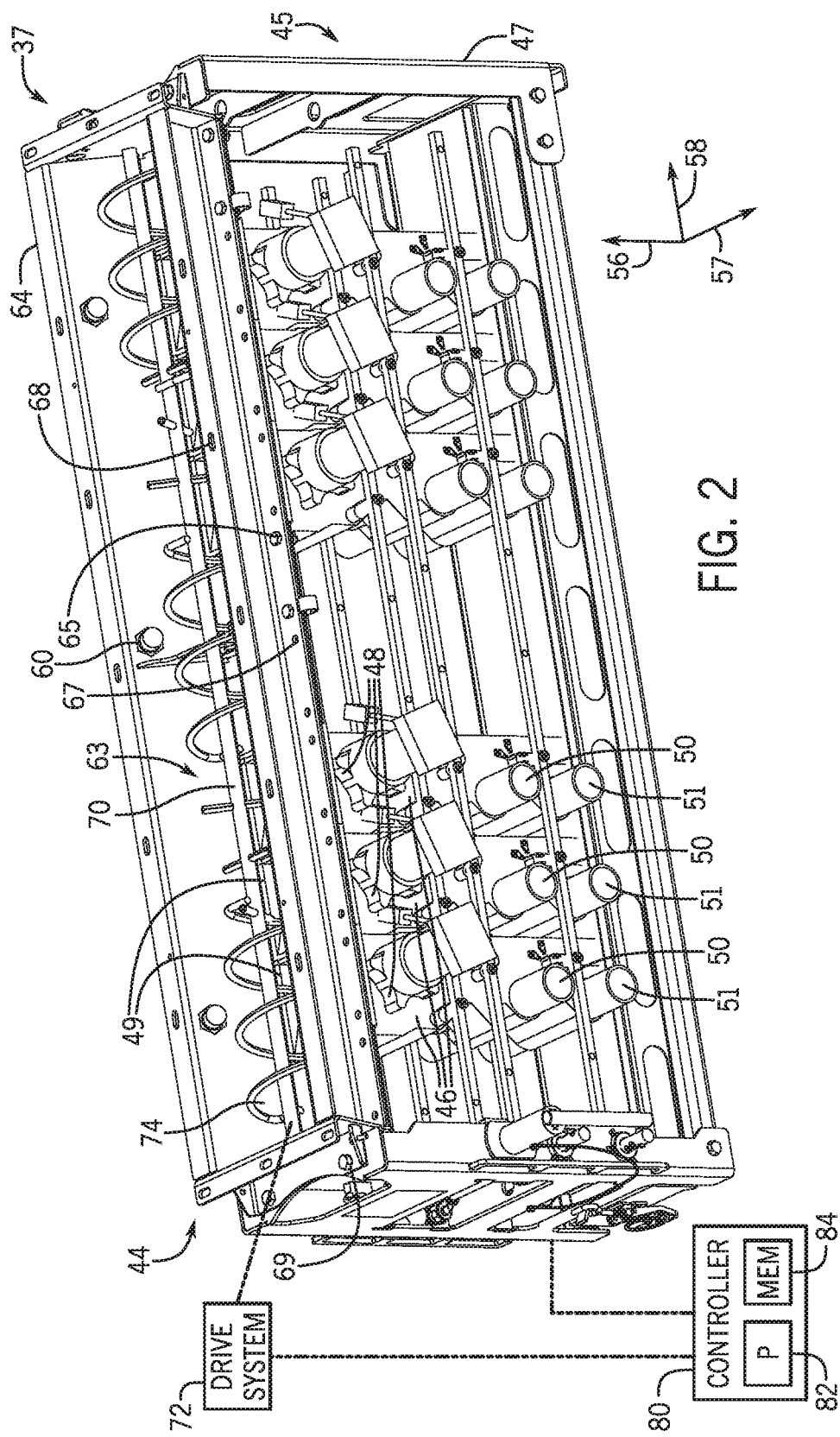
FIG. 2 is a perspective view of an embodiment of a particulate material sensing and agitation control system that may be employed within the air cart of FIG. 1, in accordance with an aspect of the present disclosure.

FIG. 2 is a perspective view of an embodiment of a particulate material sensing and agitation control system 37 that may be employed within the air cart 12 of FIG. 1. The particulate material sensing and agitation control system 37 includes an agitating system 44 positioned above the metering system 45. As illustrated, the metering system 45 includes multiple seed meters 46 supported by a frame 47. The metering system 45 may include 1 to 10, or more than 10 (e.g., 15), seed meters 46. In the illustrated embodiment, each seed meter 46 includes at least one respective metering device 48 (e.g., meter roller) to control flow of particulate material to a respective conduit. Each seed meter 46 also includes an inlet 49 configured to receive the particulate material from the agitating system 44 (e.g., along a vertical axis 56). Furthermore, each seed meter 46 includes a first conduit connector 50 and a second conduit connector 51. Each conduit connector 50, 51 is configured to receive air flow from the air source and the particulate material from the metering device 48, thereby producing the air/material mixture. First primary conduits may be coupled to the first conduit connectors 50 and second primary conduits may be coupled to the second conduit connectors 51. Furthermore, the metering system 45 may include a gate that enables selection of the first conduit connector 50 or the second conduit connector 51. Once the first conduit connector 50 or the second conduit connector 51 is selected, particulate material flows through the selected conduit connector 50, 51. The primary conduits may be coupled to respective headers that provide particulate material to multiple row units.

The illustrated embodiment includes a sub-hopper 64, which may be considered a part of the secondary storage tank. The sub-hopper 64 is secured to the metering system 45 (e.g., the frame 47 of the metering system 45) by fasteners 65 disposed through holes 67, 69 of the sub-hopper 64. The first holes 67 are generally aligned along a length of the sub-hopper 64 along a longitudinal axis 58, and the second holes 69 are arranged along a width of the sub-hopper 64 along a lateral axis 57. The sub-hopper 64 also includes third holes 68 configured to receive fasteners for securing the sub-hopper 64 to a structure of the secondary storage tank or another portion of the agricultural system (e.g., the air cart). Additionally or alternatively, the sub-hopper may be coupled to the frame and the secondary storage tank by other suitable devices, such as welds, tabs, and the like.

Generally, the particulate material may flow downwardly through the secondary storage tank 36 to the metering system 45 via the agitating system 44. That is, the particulate material may flow through the sub-hopper 64 into the inlets 49 of the seed meters 46. In some embodiments, the particulate material may pass through other features of the agricultural system (e.g., of the air cart) before entering the metering system 45.

In the illustrated embodiment, the agitating system 44 includes sensors 60. As illustrated, three sensors 60 are placed along a wall of the sub-hopper 64 (e.g., along the longitudinal axis 58). However, more or fewer sensors may be employed in alternative embodiments. For example, certain embodiments may include 1, 2, 4, 6, 8, 10, 12, 14, or more sensors. Each of the sensors 60 is configured to detect a presence of particulate material at the location or position of the respective sensor. As such, the sensors 60 may determine a profile of particulate material disposed in the sub-hopper 64 and/or the secondary storage tank 36 before, during, and/or after operation of the agricultural system 8. A variety of sensor(s), such as ultrasonic sensor(s), electrostatic sensor(s), inductive sensor(s), capacitive sensor(s), Light Detection and Ranging (LIDAR) sensor(s), and/or other suitable sensor(s) may be used alone or in combination with one another to determine the profile of the particulate material. The sensor(s) may also include one or more cameras disposed in the sub-hopper 64 and/or secondary storage tank 36, in which the camera(s) may be configured to detect the profile. Additionally or alternatively, one or more sensor(s) may be disposed higher in the particulate material sensing and agitation control system or above the particulate material sensing and agitation control system (e.g., along the vertical axis 56). As illustrated in FIG. 2, the sensors 60 are aligned in a row above the agitating system 44. However, the sensors may be disposed in other suitable configurations/arrangements in the particulate material sensing and agitation control system and/or secondary storage tank.

An agitator 63 of the agitating system 44 is disposed within the sub-hopper 64 and extends along the longitudinal axis 58 in an area below the sensors 60 along the vertical axis 56. In certain embodiments, the agitating system may be mounted higher in the secondary storage tank relative to the sub-hopper. For example, the agitating system may be disposed above the sub-hopper, such as within the structure of the secondary storage tank. As the particulate material rests in the secondary storage tank, the particulate material may clump together to form pieces that are larger than desired (e.g., larger than the openings of the inlets 49). When the particulate material flows through the agitating system 44 (e.g., while the agitating system 37 is operating), the clumps of particulate material break into smaller pieces more suitable for flowing through the metering system 45.

The agitator 63 includes a shaft 70 coupled to a drive system 72, and the agitator 63 includes an agitator coil 74 coupled to the shaft 70. In the illustrated embodiment, the agitator coil 74 is wrapped around the shaft 70 and is configured to enable the particulate material to flow between the shaft 70 and the agitator coil 74. Although this disclosure primarily discusses the agitator coil 74 as wrapped in a helical form, in additional or alternative embodiments, the agitator coil may be wrapped in a cylindrical form, a conical form, another suitable form, or any combination thereof, around the shaft. Additionally or alternatively, the agitator may include fingers or protrusions that extend from the shaft, in which movement of the fingers or protrusions induce movement of the particulate material. The agitator may include a certain configuration of fingers or protrusions, such as a concentration (e.g., a number per unit length) of fingers or protrusions, a length of each finger or protrusion, a shape of each finger or protrusion, a position of the fingers or protrusions, and so forth, that may vary along the length of the shaft. Furthermore, there may be more than one agitator coil coupled to the shaft at different locations along the length of the shaft. In the illustrated embodiment, the agitator 63 may rotate to move particulate material in the sub-hopper 64 and/or the secondary storage tank. The agitator 63 may be configured to rotate in either direction to move the particulate material toward each longitudinal side of the sub-hopper 64. In embodiments of the agitating system having more than one agitator, multiple drives may be coupled to respective agitators (e.g., the shafts) to enable movement of each agitator to be independently controllable. In certain embodiments, other types of agitators may be used in the agitating system. For example, an agitator may move linearly in the sub-hopper (e.g., along the longitudinal axis 58) to move the particulate material.

The drive system 72 of the particulate material sensing and agitation control system 37 may be configured to drive the agitator 63 to rotate, such as via a motor (e.g., an electric motor, hydraulic motor, etc.). In the illustrated embodiment, the drive system 72 includes a single motor disposed at an end of the sub-hopper 64. However, additional or alternative embodiments of the drive system may include more than one motor (e.g., 2, 3, 4, 5, etc.). For example, the drive system may include a motor disposed at each longitudinal end of the sub-hopper (e.g., along the longitudinal axis 58). The drive system may also include motor(s) disposed along the length of the sub-hopper. Motor(s) disposed along the length of the sub-hopper may be connected to the agitator and may be configured to drive the agitator. As the agitator 63 turns, the agitator 63 drives the particulate material to move within the sub-hopper 64.

In the illustrated embodiment, the agitating system 44 includes a single agitator 63. In certain embodiments, multiple agitators (e.g., 2, 3, 4, 5, 6, 7, 8, etc.) may be disposed in the sub-hopper and/or the secondary storage tank. The agitators may be disposed in series or in parallel. In a configuration with more than one agitator, drive system(s) may drive only a portion of the agitators or all of the agitators to move the particulate material in one or more directions. Multiple agitators may also be disposed at different levels in the sub-hopper and/or secondary storage tank. For example, one or more agitator(s) may be disposed in the sub-hopper and one or more agitator(s) may be disposed higher in the secondary storage tank.

In some embodiments, the agricultural system includes a controller 80 that is communicatively coupled to the particulate material sensing and agitation control system 37. The controller 80 may control operation of the particulate material sensing and agitation control system 37, such as rotation of the agitator 63 by controlling the drive system 72. The controller 80 includes a processor 82 configured to execute software code or instructions stored on a memory 84. Moreover, the controller 80 is communicatively coupled to the sensors 60 and the drive system 72 to enable operation of the drive system 72 based on feedback from the sensors 60. The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

As an example, the memory 84 may store processor-executable software code or instructions (e.g., firmware or software), which are tangibly stored on a tangible computer readable medium. Additionally or alternatively, the memory 84 may store data (e.g., information regarding operation of the particulate material sensing and agitation control system 37). As an example, the memory 84 may include a volatile memory, such as random access memory (RAM), and/or a nonvolatile memory, such as read-only memory (ROM), flash memory, a hard drive, or any other suitable optical, magnetic, or solid-state storage medium, or a combination thereof. Furthermore, the processor 82 may include multiple microprocessors, one or more "general-purpose" microprocessors, one or more special-purpose microprocessors, and/or one or more application specific integrated circuits (ASICS), or some combination thereof. For example, the processor 82 may include one or more reduced instruction set (RISC) or complex instruction set (CISC) processors. The processor 82 and/or memory 84, and/or an additional processor and/or memory, may be located in any suitable portion of the agricultural system. For instance, a memory may be located in the drive system 72.

Figure 3:
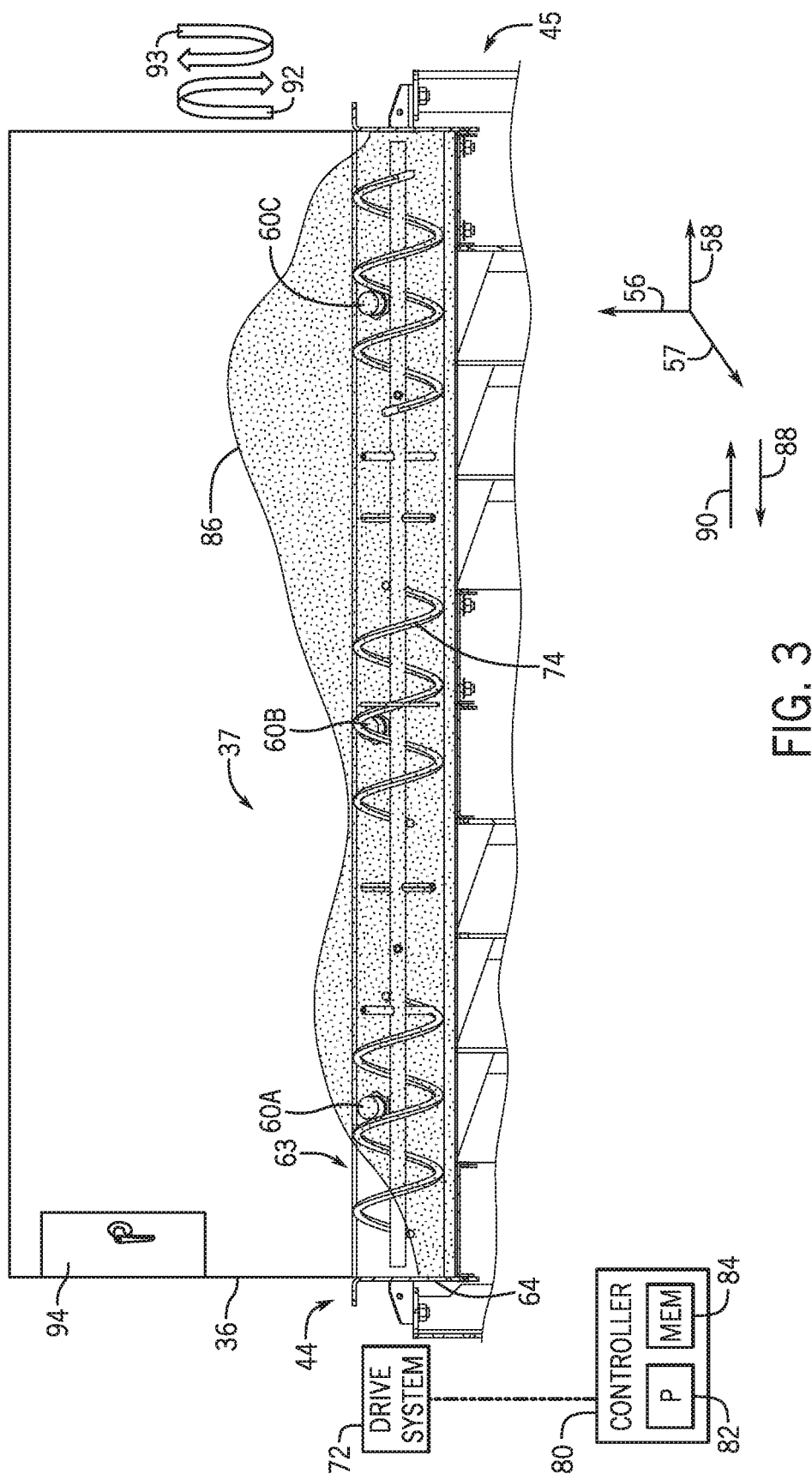
FIG. 3 is a cross-sectional side view of the particulate material sensing and agitation control system of FIG. 2 with particulate material disposed therein, in which the particulate material has a profile with an approximately even level, in accordance with an aspect of the present disclosure.

FIG. 3 is a cross-sectional side view of the particulate material sensing and agitation control system 37 of FIG. 2 with particulate material 86 disposed therein, in which the particulate material 86 has a profile with an approximately even level. That is, the particulate material may be disposed at various levels within the sub-hopper 64 along the longitudinal axis 58, thereby establishing a particular profile. In the illustrated embodiment, the particulate material 86 extends from the secondary storage tank 36 to the sub-hopper 64 and the particulate material 86 is approximately level in the secondary storage tank 36 such that the particulate material 86 is distributed across the sensors 60 along the longitudinal axis 58. However, during operation of the agricultural system, particulate material may be distributed in an uneven profile, such as above, partially above, below, or partially below certain sensors 60.

The sensors 60 may determine the profile of the particulate material 86 in the sub-hopper 64 and/or the secondary storage tank 36 based on the position of the particulate material 86 as detected by the sensors 60. The profile is the shape of the top surface of the particulate material 86 disposed in the sub-hopper 64 and/or the secondary storage tank 36 and may be one-dimensional (e.g., along the longitudinal axis 58) or two-dimensional. Additionally, the profile may include a series of levels in which each level spans a portion of the width of the sub-hopper 64 or the secondary storage tank 36. For example, each sensor 60 may detect a presence of particulate material 86 in the sub-hopper 64 and/or the secondary storage tank 36 proximate to the sensor 60. Based on the number of sensors 60 that detect the presence of particulate material 86, the width of each level of the particulate material 86 may be determined. In certain embodiments, the sensors 60 may be communicatively coupled to the controller 80 and, thus, may output signals indicative of the detected levels of particulate material 86 to the controller 80. The controller 80 may determine the profile of particulate material 86 based on the detected levels (e.g., by linearly extrapolating the data points or by another suitable method). Alternatively, a single sensor may be used alone or in combination with other sensors to determine the profile of particulate material 86. For example, a single LIDAR sensor (e.g., mounted near a top portion of the secondary storage tank 36) may be configured to determine the profile. Further still, instead of utilizing sensors configured to detect a presence of particulate material 86, the particulate material sensing and agitation control system may be configured to determine the profile of particulate material based on another operating parameter. For example, the particulate material sensing and agitation control system may be configured to monitor a load (e.g., weight) exerted by the particulate material onto the secondary storage tank, the agitator, and/or the sub-hopper to determine the profile of particulate material. In additional or alternative embodiments, the particulate material sensing and agitation control system may be configured to monitor a torque on a motor of the drive system to determine and/or facilitate determination of the profile.

With the determined profile, the controller 80 may determine an appropriate operating mode for the agitating system 44. For example, the controller 80 may be configured to operate the agitating system 44 in different operating modes. As used herein, an operating mode of the agitating system 44 refers to operating the agitating system 44 in a particular manner to interact with the particulate material 86 within the sub-hopper 64 and/or secondary storage tank 36, such as to adjust the profile of the particulate material 86 in the secondary storage tank 36 and/or in the sub-hopper 64. For example, the controller 80 may instruct the agitating system 44 to operate in an agitation mode or a leveling mode.

Operating the agitating system 44 in the agitation mode directs particulate material 86 from the secondary storage tank 36 to the metering system 45. For example, the agitating system 44 may break up clumps of the particulate material 86 to enable the particulate material 86 to flow through the inlets of the metering system 45. In the agitation mode, the drive system 72 may be operated to limit a consumption of energy while effectively inducing movement of the particulate material 86 to flow from the secondary storage tank 36 to the metering system 45.

Moreover, operating the agitating system 44 in the leveling mode causes the agitator 63 to adjust the profile of the particulate material 86. For example, the agitating system 44 may be controlled to adjust the levels of certain longitudinal sections of the profile of particulate material 86 (e.g., to adjust the amount of particulate material 86 in the sections). In certain embodiments, the agitating system 44 may operate in different leveling modes based on the profile of the particulate material 86. Each leveling mode may be configured to cause the agitating system 44 to adjust the profile of the particulate material 86 in a different way and/or to a different degree. For example, the leveling modes of the agitating system 44 may be selected to control a rate and/or a direction of particulate material movement within the sub-hopper 64 and/or the secondary storage tank, thereby controlling the profile of the particulate material 86 along the longitudinal axis 58.

As discussed herein, the agitating system 44 may be configured to operate in a particular operating mode based on the profile of the particulate material 86, as determined based on feedback from the sensors 60. For example, the drive system 72 may operate the agitator 63 based on the operating mode, and the operating mode may be selected based on which sensor(s) 60 detect particulate material 86. The profile of the particulate material 86 may change as the agitating system 44 drives the particulate material 86 to move along the longitudinal axis 58, and therefore, the operating mode of the agitating system 44 may dynamically change during operation of the agricultural system based on the profile of particulate material 86, as determined by the particulate material sensing and agitation control system 37. In one example, the controller 80 may determine the profile of particulate material 86 is uneven based on feedback from the sensors 60. As such, the controller 80 may operate the agitating system 44 in one of the leveling modes to level the profile of the particulate material 86. When the controller 80 determines the profile of particulate material 86 is even, the controller 80 may change from operating the agitating system 44 in the leveling mode to operating the agitating system 44 in the agitation mode.

In both the agitation mode and the leveling modes, the drive system 72 may rotate the agitator 63 in a first direction 92 and a second direction 93, in which rotating the agitator 63 may be considered an active operation of the agitating system. By way of example, rotating the agitator 63 in the first direction 92 shifts a portion of the particulate material 86 in a first longitudinal direction 88 along the longitudinal axis 58. Additionally, rotating the agitator 63 in the second direction 93 shifts a portion of particulate material 86 in a second longitudinal direction 90, opposite the first longitudinal direction 88, along the longitudinal axis 58. In alternative embodiments, rotating the agitator in the first direction shifts the particulate material in the second longitudinal direction and rotating the agitator in the second direction shifts the particulate material in the first longitudinal direction.

In certain embodiments, the drive system 72 may be configured to alternate between rotating the agitator 63 in the first direction 92 and the second direction 93. For example, the drive system 72 may rotate the agitator 63 in the first direction 92 for a first time duration, and after the first time duration has elapsed, the drive system 72 may rotate the agitator 63 in the second direction 93 for a second time duration. After the second time duration has elapsed, the drive system 72 may rotate the agitator 63 in the first direction 92 again for the first time duration to restart the cycle. In this manner, the agitator 63 may alternate between shifting a portion of the particulate material 86 along the first longitudinal direction 88 and shifting a portion of the particulate material 86 along the second longitudinal direction 90. The first time duration and the second time duration may vary between the different operating modes of the agitating system 44. Although the present disclosure discusses examples of certain first and second time durations, various embodiments of the particulate material sensing and agitation control system may have different first and second time durations. For example, the first and second time durations may be based on a geometry of the agitator coil 74, a geometry of the secondary storage tank 36, and/or an operating speed (e.g., rotational speed) of the agitator 63. Furthermore, in alternative embodiments, instead of rotating the agitator between a first and second time duration, the agitator may be rotated a number of rotations. That is, the drive system may rotate the agitator a first number of rotations in the first direction and a second number of rotations in the second direction, in which the difference between the first number of rotations and the second number of rotations may be based on an operating mode of the agitating system. For example, the first number may be equal to the second number to maintain or distribute particulate material evenly in the secondary storage tank and/or sub-hopper, while the first number may be different from the second number in order to move particulate material to a side of the secondary storage tank and/or sub-hopper. In further embodiments, the agitator may be rotated based on other parameters, such as a speed of the agitator, an amount of particulate material moved by the agitator, and the like, as based on the operating mode of the agitating system.

Additionally, between rotating the agitator 63 in the first direction 92 and in the second direction 93, the drive system 72 may be configured to deactivate operation of the agitator 63 and/or maintain a position of the agitator 63, which may be considered a dwell or inactive operation of the agitating system 44. As with the first time duration and the second time duration, the duration of the inactive operation (e.g., the dwell time) may vary for the different operating modes of the agitating system 44. Furthermore, the dwell time may be based on certain parameter(s), such as a density of the particulate material 86 and/or an operation of the metering system 45. Thus, a cycle of operation of the agitating system 44 includes driving the agitator 63 in the first direction 92 for the first time duration, suspending operation of the agitator 63 for a first dwell time, driving the agitator 63 in the second direction 93 for the second time duration, and suspending operation of the agitator 63 for a second dwell time that may be the same or a different duration as the first dwell time. By alternating between active and inactive operations, the drive system 72 may rotate the agitator 63 enough to induce movement of the particulate material 86 through the sub-hopper 64 or the secondary storage tank 36, while also limiting usage to reduce consumption of energy. While this disclosure primarily discusses rotation of the agitating system 44, additionally or alternatively, the drive system may move the agitating system in a different manner (e.g., in the first and second longitudinal directions 88, 90) in the operating modes of the agitating system. Moreover, while this disclosure primarily discusses that rotation speed of the agitating system 44 in the first direction 92 is approximately the same rotation speed of the agitating system 44 in the second direction 93, in additional or alternative embodiments, rotation speed of the agitating system 44 may vary in each direction 92, 93, such as based on the operating mode of the agitating system 44.

In additional or alternative embodiments, the drive system may cause the agitator to alternate between blocks of first movement and second movement, with corresponding inactive operations between each active operation. For example, the drive system may rotate the agitator in the first direction for two consecutive iterations with an inactive operation in between, and then the drive system may rotate the agitator in the second direction for two consecutive iterations with another inactive operation in between. The number of iterations for the first movement may be different from the number of iterations for the second movement, and the number of iterations and the duration of each iteration may be based on the particular operating mode of the agitating system 44.

In some embodiments, the secondary storage tank 36 may also include a door 94 that may be opened to access inside of the secondary storage tank 36. For example, the operator may open the door 94 to load particulate material directly into the secondary storage tank 36. While the operator is loading particulate material into the secondary storage tank 36, operation of the metering system 45 may be suspended or deactivated to limit the amount of particulate material directed out of the secondary storage tank 36 (e.g., to the primary conduits), thereby enabling the particulate material to fill the secondary storage tank 36. Furthermore, the agitating system 44 may be operating in a door-dump mode, in which the agitating system 44 is configured to distribute the particulate material in the secondary storage tank 36 and/or the sub-hopper 64 as the particulate material is loaded into the secondary storage tank 36. In certain implementations, the door-dump mode may be activated upon activation of a door-dump switch, such as by the operator or the controller. During the door-dump mode, the drive system 72 may be configured to rotate the agitator 63 in a single direction (e.g., the first direction 92) to move particulate material away from the door 94. That is, since particulate material may be loaded onto and fill the longitudinal side of the secondary storage tank 36 proximate to the door 94, the agitating system 44 may rotate to move the particulate material away from the door 94 and distribute the particulate material throughout the secondary storage tank 36 and the sub-hopper 64. However, in additional or alternative embodiments, the drive system may be configured to move in both the first and the second directions during operation of the door-dump mode, such as based on a detection of particulate material via the sensors.

The agitating system 44 may operate the door-dump mode for a door-dump time duration based on the determined profile of the particulate material 86 in the secondary storage tank 36 and/or the sub-hopper 64. The door-dump time duration may be based on which sensor(s) detect the particulate material 86 when the switch is activated, while the particulate material is loaded into the secondary storage tank 36 after the switch has been activated, and/or while the door-dump mode is active. For example, the door-dump time duration may include a maximum or preset time in which the agitating system 44 is configured to operate, such as when there is no particulate material detected in the secondary storage tank 36 and the sub-hopper 64, to enable greater distribution of the particulate material. However, if one or more sensors detect particulate material, the door-dump time duration may be less than (e.g., a fraction of) the preset time, as will be further described below. Thus, the agitating system 44 distributes the particulate material throughout the secondary storage tank 36 and/or the sub-hopper 64 without placing undesirable stress on the agitating system 44 or consuming an undesirable amount of energy to operate the agitating system 44.

As illustrated in FIG. 3, the profile of the particulate material 86 causes each sensor 60 to detect the presence of the particulate material 86 at the location of the sensor 60. Accordingly, the controller 80 may determine that the level of the profile of the particulate material 86 is substantially even. When the level of the profile of the particulate material 86 is substantially even, the controller 80 may be configured to operate the agitating system 44 in the agitation mode, such that clumps of the particulate material 86 are effectively broken up without excessive consumption of energy to operate the agitating system 44. In certain embodiments, the agitation mode includes a first time duration that is approximately equal to the second time duration. That is, the drive system 72 drives the agitator 63 in the first direction 92 and the second direction 93 for approximately the same duration. As used herein, an approximately equal time duration may refer to a difference in respective time durations within 1 second, 0.5 seconds, 0.1 seconds, or a smaller difference of time. The equal time in each direction 92, 93 may not move the particulate material 86 toward a side of the secondary storage tank 36 or sub-hopper 64 to maintain the profile of the particulate material 86 along the longitudinal axis 58. As an example, the first time duration and the second time duration may each be approximately 3 seconds to 7 seconds (e.g., 5 seconds), and the dwell time may be approximately 60 seconds.

Figure 4:
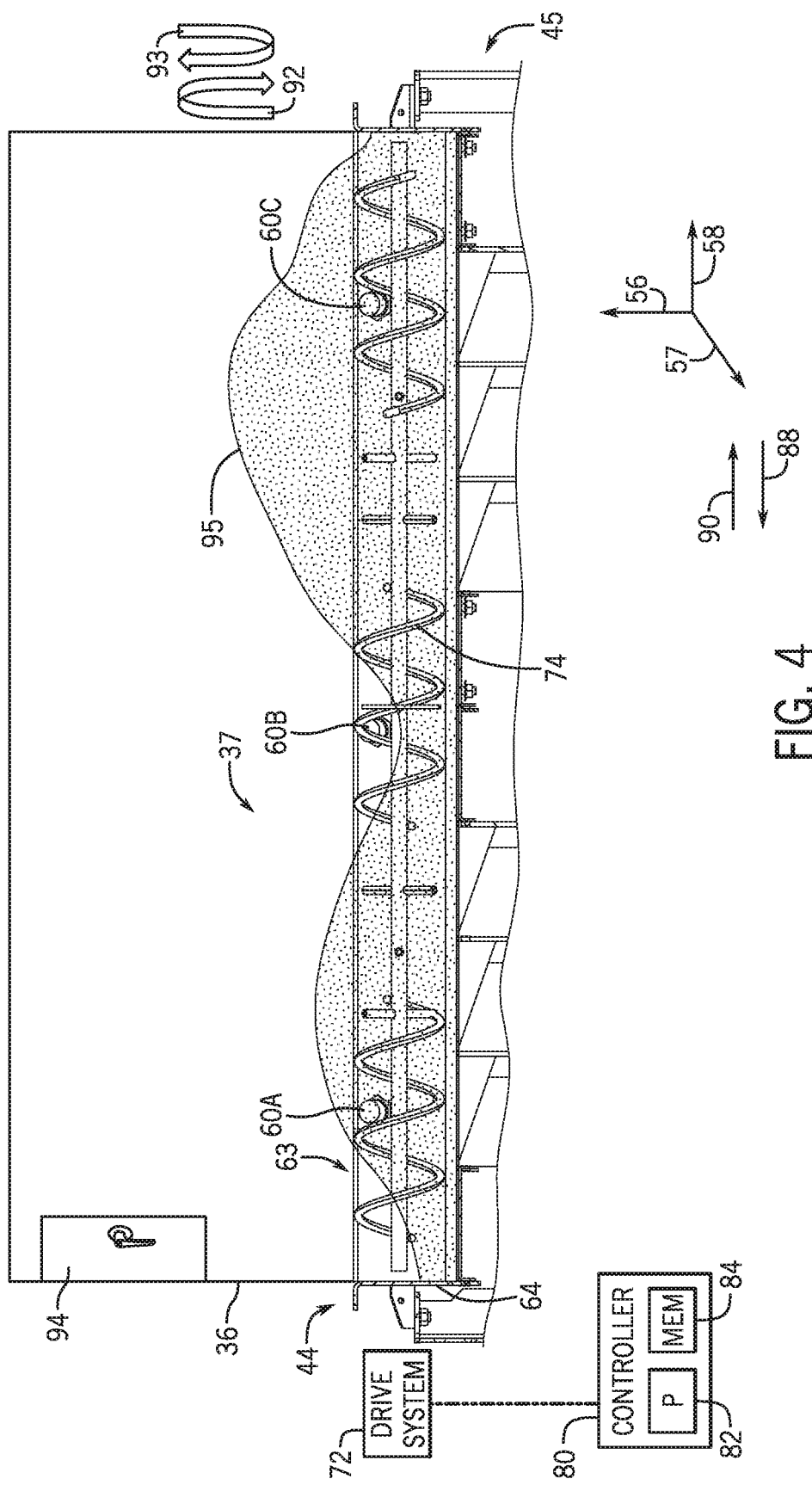
FIG. 4 is a cross-sectional side view of the material sensing and agitation control system of FIG. 2 with particulate material disposed therein, in which the particulate material has a profile with a symmetrically uneven level, in accordance with an aspect of the present disclosure.

FIG. 4 is a cross-sectional side view of the material sensing and agitation control system 37 of FIG. 2 with particulate material 95 disposed therein, in which the particulate material 95 has a profile with a symmetrically uneven level. In the symmetrically uneven profile, the two outmost sensors 60A and 60C detect particulate material 95, but the middle sensor 60B does not detect particulate material 95. In other symmetrically uneven profiles, the middle sensor detects particulate material, but the two outside sensors do not detect particulate material. In embodiments of the particulate material sensing and agitation control system having more than three sensors, the controller may identify a symmetrically uneven profile while the sensors detect a profile that is uneven and not biased toward a one longitudinal side or the other longitudinal side. By way of example, if the outmost sensors do not detect particulate material and at least one of the middle sensors does detect particulate material, the controller 80 may identify a symmetrically uneven profile. Additionally, if the outmost sensors detect particulate material and at least one of the middle sensors does not detect particulate material, the controller may also identify a symmetrically uneven profile.

When the level of the profile is symmetrically uneven, the controller 80 may operate the agitating system 44 in a symmetric leveling mode. That is, the drive system 72 may operate the agitator 63 at an increased operation relative to the agitating mode in order to move the particulate material 95 more in the longitudinal directions 88, 90. Operating the agitating system 44 may distribute the particulate material 95 more evenly throughout the secondary storage tank 36 and/or the sub-hopper 64.

In some embodiments, the first time duration may be approximately equal to the second time duration, while the agitating system 44 is operating in the symmetric leveling mode. However, the first time duration and the second time duration of the symmetric leveling mode may be greater than the first time duration and the second time duration of the agitation mode. For example, the symmetric leveling mode may have a first time duration and second time duration that are each approximately 5 seconds to 15 seconds. Additionally, the dwell time of the symmetric leveling mode may be less than the dwell time of the agitation mode. In certain embodiments, the symmetric leveling mode may have a dwell time of 10 seconds to 20 seconds. Accordingly, relative to the agitation mode, the symmetric leveling mode causes the drive system 72 to rotate the agitator 63 for a longer aggregate duration, which may promote greater movement of particulate material 95. The movement of particulate material 95 may level the profile of the particulate material 95 in the secondary storage tank 36 and/or the sub-hopper 64 (e.g., such that all sensors 60 detect particulate material).

Figure 5:
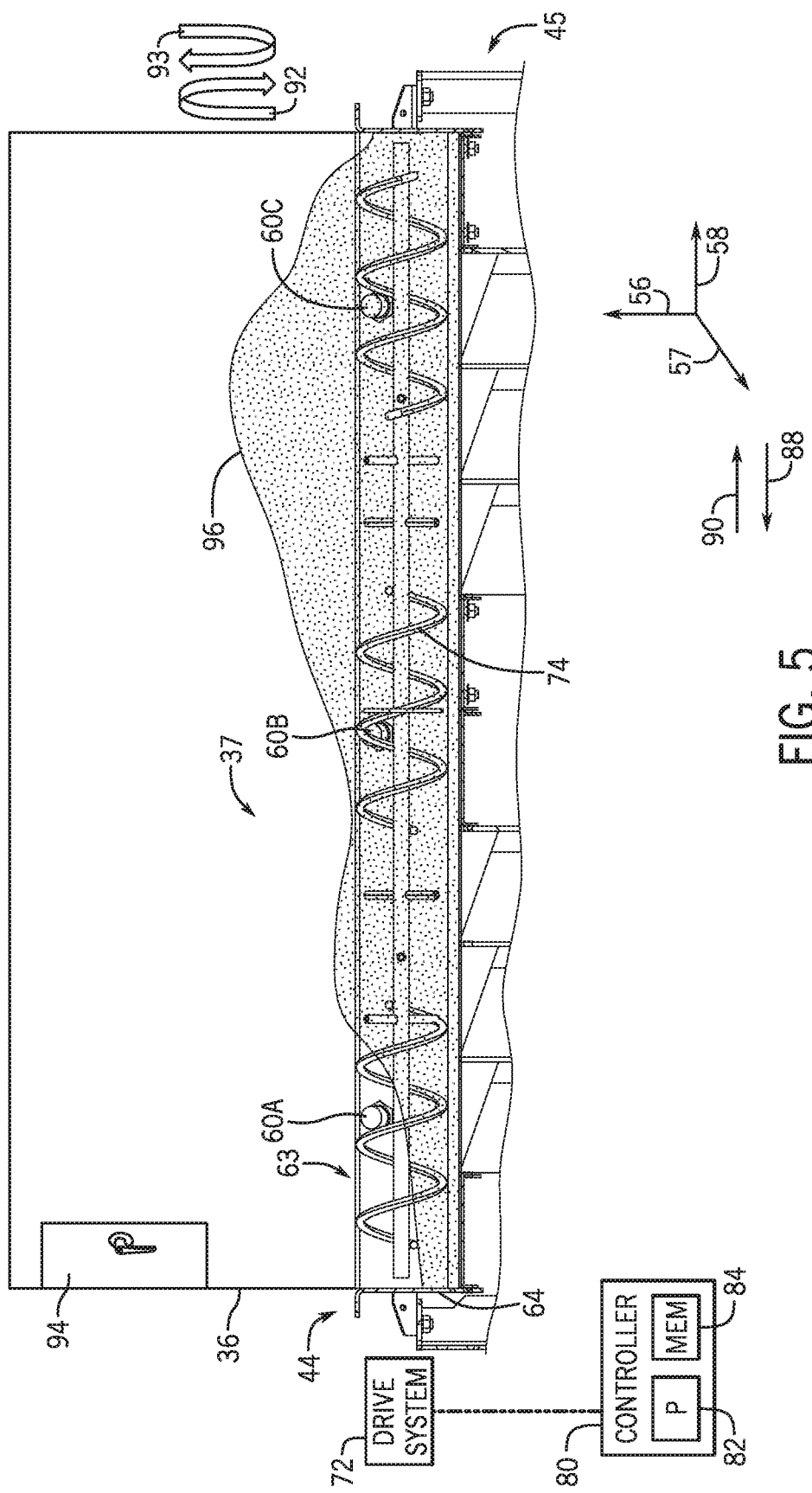
FIG. 5 is a cross-sectional side view of the particulate material sensing and agitation control system of FIG. 2 with particulate material disposed therein, in which a profile of the particulate material is skewed to cover sensors of a side of the particulate material sensing and agitation control system, in accordance with an aspect of the present disclosure.

FIG. 5 is a cross-sectional side view of the particulate material sensing and agitation control system 37 of FIG. 2 with particulate material 96 disposed therein, in which a profile of the particulate material 96 is skewed to cover sensors 60 of a side of the particulate material sensing and agitation control system 37. In such profiles of the particulate material 96, the agitating system 44 may operate in a heavily biased leveling mode. With the illustrated profile of the particulate material 96, the leftmost sensor 60A and the middle sensor 60B detect particulate material 96, and the rightmost sensor 60C does not detect particulate material 96. Alternatively, the profile of particulate material may be arranged such that the rightmost sensor detects the particulate material, and the other two sensors do not detect the particulate material. In embodiments having more than three sensors, the agitating system may operate in the heavily biased leveling mode when a majority of sensors positioned along a left or right longitudinal side of the secondary storage tank or the sub-hopper detects particulate material, while the remaining sensors (e.g., the sensor positioned at a central position and along the other side of the secondary storage tank or the sub-hopper) do not detect the particulate material. For example, in an embodiment of the particulate material sensing and agitation control system having ten sensors, the agitating system may be configured to operate in the heavily biased leveling mode when six to nine of the sensors detect particulate material, in which such sensors are proximate to one another at a particular longitudinal side of the secondary storage tank or the sub-hopper.

While the agitating system 44 is operating in the heavily biased leveling mode, the drive system 72 may rotate the agitator 63 to move the particulate material 96 toward the longitudinal side of the secondary storage tank 36 and/or the sub-hopper 64 having the sensor(s) 60 that do not detect particulate material 96. To this end, the drive system 72 may operate the agitator 63 such that the first time duration is different than the second time duration. By way of example, if the leftmost sensor 60A does not detect particulate material 96, as seen in FIG. 5, the second time duration may be approximately 30 seconds to 60 seconds, and the first time duration may be approximately 3 seconds to 7 seconds. However, if the rightmost sensor does not detect particulate material 96, the first time duration may be approximately 30 seconds to 60 seconds, and the second time duration may be approximately 3 seconds to 7 seconds. Thus, the difference between the first time duration and the second time duration in the heavily biased leveling mode may be 23 seconds to 57 seconds. Such a difference between the first time duration and the second time duration may cause the agitator 63 to move the particulate material 96 toward one longitudinal side of the secondary storage tank 36 and/or the sub-hopper 64, thereby leveling the particulate material 96 and increasing the total number of sensors 60 that detect particulate material. Moreover, the heavily biased leveling mode may avoid moving too much particulate material 96 such that certain sensors 60 no longer detect particulate material 96. In other words, the operating mode of the agitating system 44 avoids moving particulate material 96 along the longitudinal axis 58 that would uncover one of the sensors 60 that was previously covered. Additionally, in certain embodiments, the dwell time of the heavily biased leveling mode may be similar to the dwell time of the symmetric leveling mode (e.g., 10 seconds to 20 seconds).

Figure 6:
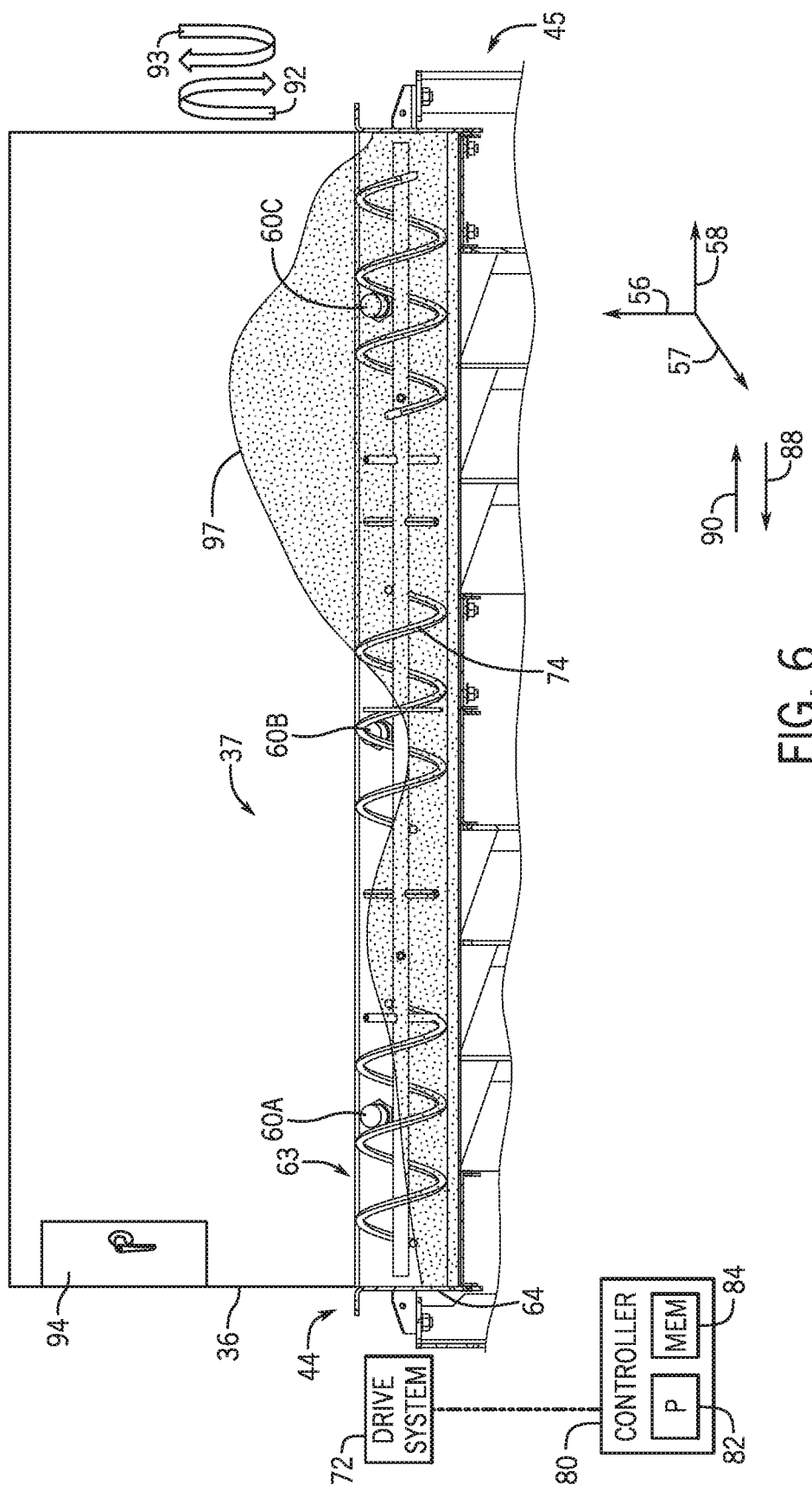
FIG. 6 is a cross-sectional side view of the particulate material sensing and agitation control system of FIG. 2 with particulate material disposed therein, in which a profile of the particulate material is skewed to cover one sensor on one side of the particulate material sensing and agitation control system, in accordance with an aspect of the present disclosure.

FIG. 6 is a cross-sectional side view of the particulate material sensing and agitation control system 37 of FIG. 2 with particulate material 97 disposed therein, in which a profile of the particulate material 97 is skewed to cover one sensor 60 on one side of the particulate material sensing and agitation control system 37. In similar profiles of the particulate material 97, agitating system 44 may operate in a moderately biased leveling mode. With the profile of the particulate material 97 illustrated in FIG. 6, the rightmost sensor 60C detects particulate material 97, but the remaining sensors 60A and 60B do not detect particulate material 97. Alternatively, the profile of the particulate material may be arranged such that the leftmost sensor detects particulate material, but the other two sensors do not detect particulate material. Further still, in embodiments having more than three sensors, the agitating system may operate in the moderately biased leveling mode when less than a majority (e.g., a minority) of sensors positioned along a left or right longitudinal side of the secondary storage tank and/or sub-hopper detect the particulate material, while the remaining sensors do not detect the particulate material. As an example, if the particulate material sensing and agitation control system has ten sensors, the agitating system may be configured to operate in the moderately biased leveling mode when one to five of the sensors detect particulate material, in which such sensors are proximate to one another at a particular longitudinal side of the secondary storage tank and/or sub-hopper.

While the agitating system 44 is operating in the moderately biased leveling mode, the drive system 72 may rotate the agitator 63 to move the particulate material 97 toward a longitudinal side of the secondary storage tank 36 and/or sub-hopper 64. As with the heavily biased leveling mode, during the moderately biased leveling mode, particulate material 97 may be moved toward the longitudinal side of the secondary storage tank 36 and/or sub-hopper 64 having the sensors 60 that do not detect particulate material 97. However, the profile of the particulate material 97 may be more sensitive relative to the profile of the particulate material 96. That is, the profile of the particulate material 97 may be more affected by rotation of the agitator 63 relative to the profile of the particulate material 96. As such, the particulate material 97 may be moved at a lower rate relative to the rate at which the particulate material 96 is moved. For example, the rotation speed or duration of the agitating system 44 during the moderately biased leveling mode may be less than the rotation speed or duration of the agitating system 44 during the heavily biased leveling mode in order to avoid over-biasing the particulate material 97 such that a certain sensor(s) 60 no longer detect particulate material 97. Accordingly, the difference between the first time duration and the second time duration for the moderately biased leveling mode may be less than the difference between the first time duration and the second time duration for the heavily biased leveling mode. For instance, in the embodiment illustrated in FIG. 5, in which the rightmost sensor 60C detects particulate material 97, the second time duration may be 12 seconds to 30 seconds, the first time duration may be 3 seconds to 7 seconds, and the dwell time may be 10 seconds to 20 seconds. When the leftmost sensor 60 detects particulate material 97, the first time duration may be 12 seconds to 30 seconds, the second time duration may be 3 seconds to 7 seconds, and the dwell time may be 10 seconds to 20 seconds. Therefore, the difference between the first time duration and the second time duration in the moderately biased leveling mode may be 5 seconds to 27 seconds.

Figure 7:
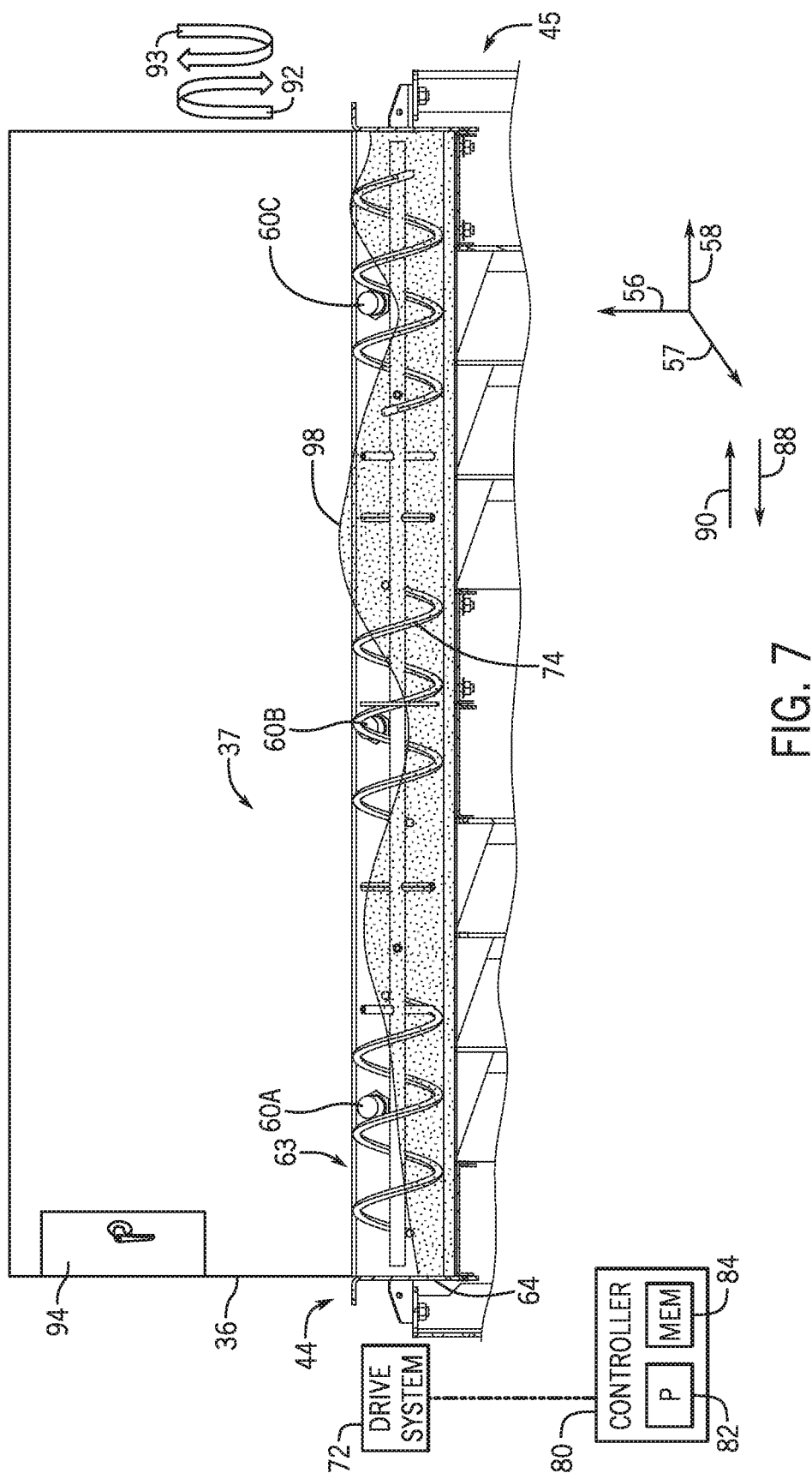
FIG. 7 is a cross-sectional side view of the particulate material sensing and agitation control system of FIG. 2 with particulate material disposed therein, in which a profile of the particulate material may not cover any of the sensors of the particulate material sensing and agitation control system, in accordance with an aspect of the present disclosure.

FIG. 7 is a cross-sectional side view of the particulate material sensing and agitation control system 37 of FIG. 2 with particulate material 98 disposed therein, in which a profile of the particulate material 98 may not cover any of the sensors 60 of the particulate material sensing and agitation control system 37. That is, the particulate material 98 may be distributed in between and/or below the sensors 60. In response to no sensors 60 detecting particulate material, the controller 80 may operate the agitating system 44 in either the symmetric leveling mode or a slightly biased leveling mode based on a previous operating mode of the agitating system 44. By way of example, if the previous operating mode is the moderately biased leveling mode (e.g., if the current profile of the particulate material 98 is achieved after less than the majority of sensors 60 positioned along a longitudinal side of the particulate material sensing and agitation control system 37 detected the presence of particulate material 98), the controller 80 may operate the agitating system 44 in the slightly biased leveling mode. For example, if the previous operating mode is the moderately biased leveling mode, the previous profile of the particulate material may have been skewed toward a longitudinal side of the secondary storage tank 36 and/or sub-hopper 64, similar to the profile of the particulate material 97 of FIG. 6. As such, the current profile of the particulate material 98 may also still be generally skewed toward the same longitudinal side of the secondary storage tank and/or sub-hopper 64. As a result, the controller 80 may operate the agitating system 44 in the slightly biased leveling mode to move the particulate material 98 toward the longitudinal side that did not detect the particulate material 98 (i.e., the side that the particulate material 98 was not skewed) and level the profile of the particulate material 98.

In the slightly biased leveling mode, the difference between the first time duration and the second time duration is less than the difference between the first time duration and the second time duration of the heavily biased leveling mode and of the moderately biased leveling mode. For example, if the rightmost sensor 60C previously detected the presence of the particulate material 98 and the remaining sensors 60A, 60B did not detect the presence of the particulate material 98, the second time duration may be 7 seconds to 8 seconds, the first time duration may be 9 seconds to 11 seconds, and the dwell time may be 10 seconds to 20 seconds. As such, particulate material 98 is slightly moved toward the sensors 60 that previously did not detect the presence of particulate material 98, while avoiding biasing too much particulate material 98 away from the sensor 60 that previously did detect the presence of particulate material 98. Likewise, if the leftmost sensor 60A previously detected the presence of the particulate material 98 and the remaining sensors 60B, 60C did not detect the presence of the particulate material 98, the first time duration may be 7 seconds to 8 seconds, the first time duration may be 9 seconds to 11 seconds, and the dwell time may be 10 seconds to 20 seconds. In this manner, the discrepancy of the first time duration and the second time duration in the slightly biased leveling mode may be between 1 second to 4 seconds.

If the previous operating mode is not the moderately biased operating mode, the controller 80 may operate the agitating system 44 in the symmetric leveling mode, in which the first time duration and the second time duration may each be substantially equal (e.g., within 1 second, 0.5 seconds, 0.1 seconds). For example, the first and second time durations may each be 5 seconds to 15 seconds, and the dwell time may be 10 seconds to 20 seconds. As mentioned, if the agitating system 44 was previously operating in the moderately biased leveling mode, the previous profile of the particulate material 98 may have been skewed toward a longitudinal side of the secondary storage tank 36 and/or the sub-hopper 64. However, if the agitating system 44 was not previously operating in the moderately biased leveling mode, the previous profile of the particulate material 98 may not have been skewed toward a longitudinal side of the secondary storage tank 36 and/or the sub-hopper 64. For instance, the previous profile of the particulate material 98 may have been similar to the profile of the particulate material 86 of FIG. 3. As such, the controller 80 may operate the agitating system 44 in the symmetric leveling mode to distribute particulate material throughout the secondary storage tank 36 and/or the sub-hopper 64 and level the profile of the particulate material 98.

Figure 8:
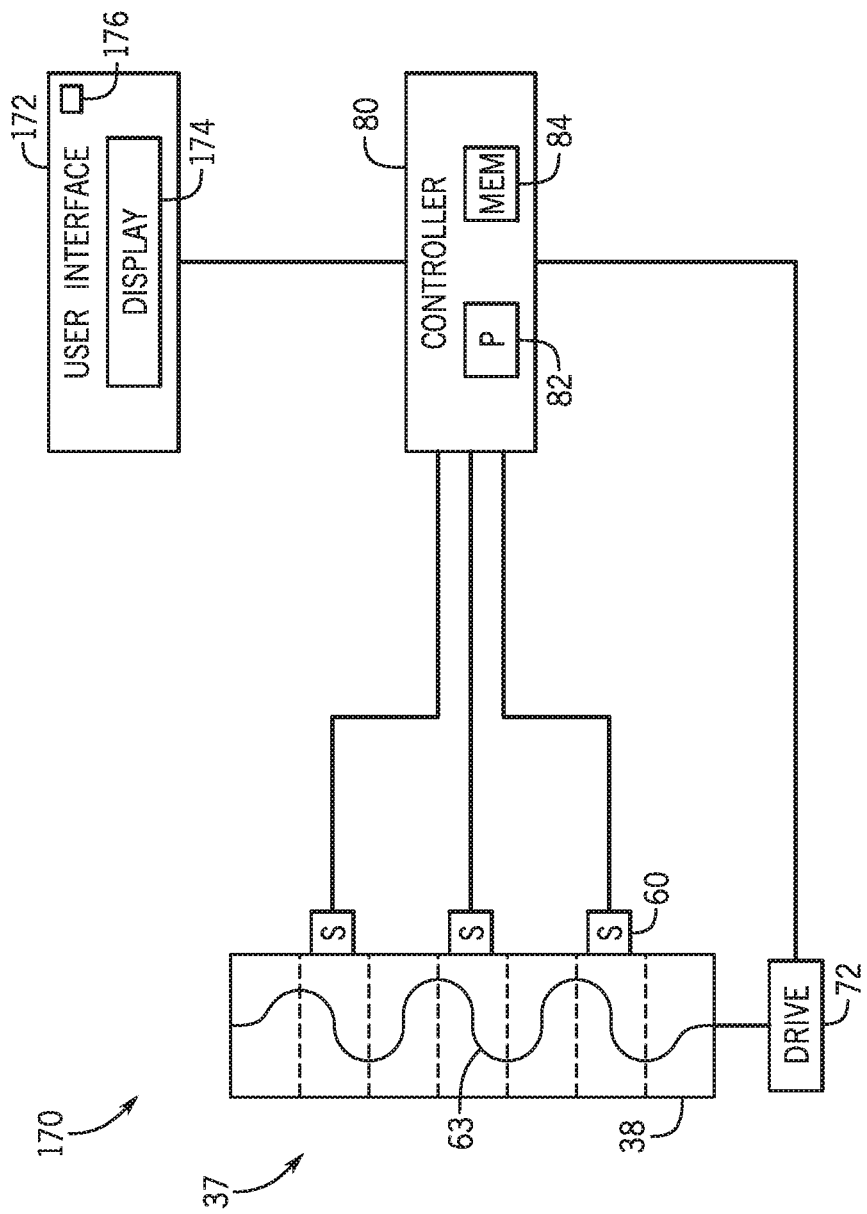
FIG. 8 is a schematic view of an embodiment of a particulate material sensing and agitation control system having a control system, in accordance with an aspect of the present disclosure.

FIG. 8 is a schematic view of an embodiment of a particulate material sensing and agitation control system 37 having a control system 170. In certain embodiments, the control system 170 includes a user interface 172. The controller 80 may output signals to the user interface 172 indicative of operation of the particulate material sensing and agitation control system 37. In the illustrated embodiment, the user interface 172 includes a display 174, which may present visual information to an operator, such as a graph depicting operation of the particulate material sensing and agitation control system 37. Based on this display of information, the operator may manually operate the agricultural system 8, such as the agitating system 44. For example, in the illustrated embodiment, the user interface 172 includes a user interaction device 176, such as a touch screen, a button, a keyboard, a microphone, a mousing device, a trackpad, and the like, to enable user input. The user input may be associated with adjusting operation of the agricultural system 8, such as operation of the particulate material sensing and agitation control system 37.

In some embodiments, the operator may use the user interface 172 to adjust the operating mode of the agitating system. For example, the operator may set the operating mode to a leveling mode, which may override the operating mode determined by the controller 80 based on feedback from the sensors 60, as discussed above. The operator may also enable or disable certain operating modes, such as the agitating mode, of any of the agitating systems to suspend operation of the particular agitating system. In additional or alternative embodiments, the operator may control parameters associated with operation of the particulate material sensing and agitation control system 37. As an example, the operator may use the user interface 172 to adjust a number of active sensors that provide feedback to the controller 80 for determination of the operating mode, set times for the leveling modes, or another parameter (e.g., dimensions of the sub-hopper or secondary storage tank to automatically update the set times for the operating modes). Further still, the operator may use the user interface 172 to activate the door-dump mode and/or to adjust a parameter of the door-dump mode. By way of example, the operator may adjust the preset door-dump time.

Figure 9:
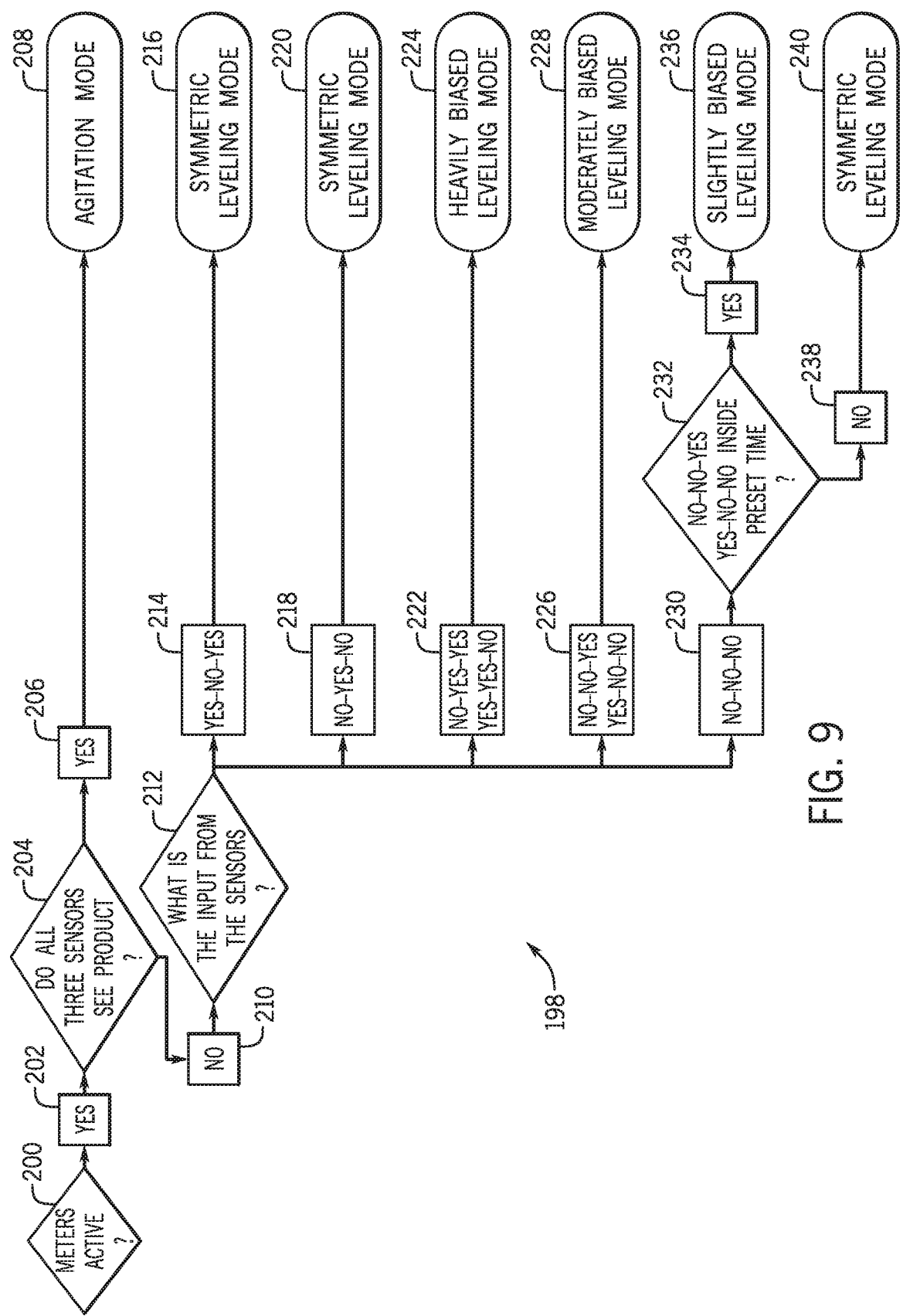
FIG. 9 is a flowchart of an embodiment of a method to control a particulate material sensing and agitation control system while the particulate material sensing and agitation control system is metering particulate material and all sensors of the particulate material sensing and agitation control system are functioning, in accordance with an aspect of the present disclosure.

FIGS. 9-11 each illustrate an embodiment of a method to determine the operating mode of the agitating system. In some embodiments, each method may be performed by a controller, such as the controller 80. Additionally, it should be understood that each illustrated method is not an exclusive embodiment. In other words, additional steps or different steps may be performed relative to the steps depicted in FIGS. 9-11. For example, the steps of FIGS. 9-11 may be different for an embodiment of the particulate material sensing and agitation control system implementing a different number and/or arrangement of sensors than discussed herein, and the steps may be performed in any suitable order, such as the same or a different order shown in FIG. 9.

FIG. 9 is a flowchart of an embodiment of a method 198 to control a particulate material sensing and agitation control system while the particulate material sensing and agitation control system is metering particulate material and all sensors of the particulate material sensing and agitation control system are functioning. At block 200, the controller determines a status of the metering system, which may include an active mode or an inactive mode. If the status of the metering system is determined to be active, as indicated at block 202, then seed meters of the metering system are outputting particulate material to the primary lines. In response to determining the metering system is active, the controller may determine a detection status of each sensor or, stated differently, which of the sensors of the particulate material sensing and agitation control system detects particulate material (block 204).

At block 206, the detection of all three sensors is positive, meaning all three sensors detect particulate material. As a result, the controller operates the agitating system in the agitation mode (block 208). For example, the drive system of the particulate material sensing and agitation control system may rotate the agitator in the first direction for approximately the same time duration as the drive system rotates the agitator in the second direction (e.g., 5 seconds). Additionally, the drive system may suspend movement of the agitator or maintain a position of the agitator for a dwell time (e.g., 60 seconds) between rotation in the first and second directions. The agitation mode agitates the particulate material to move from the secondary storage tank to the metering system while conserving power consumption to operate the agitating system.

At block 210, not all sensors have a positive detection status and detect particulate material. Therefore, the controller determines which of the sensors, if any, detect particulate material, as shown at block 212. As an example, each of the sensors may be communicatively coupled to the controller, in which each sensor may output the respective detection to the controller. The controller may then determine which sensor(s) detect the particulate material and determine an operating mode of the agitating system accordingly. For instance, the controller may associate the detections with the respective sensor locations to determine a profile of the particulate material and set the operating mode based on the determined profile.

At block 214, the controller determines the detection of the outermost sensors is positive and the detection status of the middle sensor(s) is negative. As a result, the controller operates the agitating system in the symmetric leveling mode (block 216). At block 218, the controller determines the detection status of the outermost sensors is negative and the detection status of the middle sensor is positive. In response, the controller operates the agitating system in the symmetric leveling mode (block 220). In certain embodiments, the symmetric leveling mode of block 216 includes approximately the same operating parameters as the symmetric leveling mode of block 220. For example, both symmetric leveling modes may have a first time duration that is approximately the same as the second time duration (e.g., 8 seconds), and both symmetric leveling modes may have the same dwell time (e.g., 15 seconds). However, in additional or alternative embodiments, the symmetric leveling mode of block 216 may have a first time, second time, and/or dwell time that is different than that of the symmetric leveling mode of block 220.

At block 222, the controller determines that the detection status of the middle sensor and one of the outermost sensors is positive, and the detection status of the remaining outermost sensor is negative. In the illustrated embodiment having three sensors, either only the leftmost sensor does not detect particulate material or only the rightmost sensor does not detect particulate material. As a result, as shown at block 224, the controller operates the agitating system in the heavily biased leveling mode, in which the first time duration (e.g., 50 seconds) is substantially different (e.g., greater) than the second time duration (e.g., 5 seconds), and the dwell time may be approximately similar to the dwell time of the symmetric leveling mode (e.g., 15 seconds).

At block 226, the controller determines that the detection status of one of the outermost sensors and of the middle sensor is negative, indicating that outermost sensor and the middle sensor does not detect particulate material. That is, either only the rightmost sensor detects particulate material or only the leftmost sensor detects particulate material. In response to such a determination, the controller operates the agitating system in the moderately biased leveling mode (block 228). In the moderately biased leveling mode, the difference between the first time duration (e.g., 30 seconds) and the second time duration (e.g., 5 seconds) may be less than the difference between the first time duration and the second time duration of the heavily biased leveling mode. Moreover, the dwell time of the moderately biased leveling mode may be approximately the same as the respective dwell times of the heavily biased leveling mode and the symmetric leveling mode (e.g., 15 seconds).

At block 230, the controller determines that the detection status of all of the sensors is negative. In response, the controller may determine which sensor(s) previously detected the particulate material. In the illustrated embodiment, the controller may determine if, previously, only one of the outermost sensors detected particulate material, and a remainder of the sensors did not detect particulate material (block 232). For example, the controller may determine if the previous operating mode of the agitating system is the moderately biased leveling mode.

At block 234, the controller determines that the previous operating mode of the agitating system is the moderately biased leveling mode (i.e., only one of the outermost sensors detected particulate material, while the remaining sensors did not detect particulate material). Therefore, the controller operates the agitating system in the slightly biased leveling mode (block 236). In the slightly biased leveling mode, the difference between the first time duration (e.g., 10 seconds) and the second time duration (e.g., 8 seconds) may be less than the difference between the first time duration and the second time duration of both the moderately biased leveling mode and the heavily biased leveling mode. Additionally, the dwell time of the slightly biased leveling mode may be approximately the same as the respective dwell times of the moderately biased leveling mode, the heavily biased leveling mode, and the symmetric leveling mode (e.g., 15 seconds).

At block 238, the controller determines that the previous operating mode of the agitating system is not the moderately biased leveling mode (i.e., a different configuration of sensors than only one of the outermost sensors detected particulate material). Accordingly, the controller may operate the agitating system in the symmetric leveling mode (block 240). In certain embodiments, the symmetric leveling mode of block 240 may include the same first time duration, second time duration, and dwell time as the symmetric leveling mode of block 220 and/or the symmetric leveling mode of block 216. In additional or alternative embodiments, the symmetric leveling mode of block 240 may have a different first time duration, second time duration, and/or dwell time relative to the symmetric leveling mode of block 220 and/or the symmetric leveling mode of block 216.

FIG. 10 is a flowchart of an embodiment of a method 248 to control a particulate material sensing and agitation control system while the particulate material sensing and agitation control system is metering particulate material and not all sensors of the particulate material sensing and agitation control system are functioning. In some instances, one or more sensors may be disabled (e.g., by the operator). In other instances, one or more sensors may be flagged as faulty, such as due to providing false readings. When non-functioning sensors are present, the controller may not completely determine the profile of the particulate material based on feedback from the sensors.

The method 248 may be considered a backup process that the controller may perform when one or more sensors are non-operational to avoid undesirable distribution of particulate material within the secondary storage tank and/or sub-hopper. Generally, the controller selects an operating mode of the agitating system that would substantially reduce the possibility that one or more sensors no longer detect particulate material. Furthermore, the selected operating mode may reduce the possibility of excessive consumption of energy. For instance, at the selected operating mode, excessive consumption of energy may be avoided to operate the agitating system and move the particulate material in the secondary storage tank and/or the sub-hopper at a greater rate than desired based on the possible profile of the particulate material. As an example, the controller may determine the possible operating modes associated with the non-functioning sensor(s) detecting particulate material and the non-functioning sensor(s) not detecting particulate material. From the possible operating modes, the controller may select the most conservative operating mode. Alternatively, the controller may select the least conservative operating mode, and may adjust the operating mode dynamically based on feedback from the sensors. As used herein, the most conservative operating mode refers to the operating mode that moves particulate material the least. In some embodiments, the order of operating modes from most conservative to least conservative includes the agitation mode, the symmetric leveling mode, the slightly biased leveling mode, the moderately biased leveling mode, and the heavily biased leveling mode. By way of example, the controller may initially drive the particulate material toward a longitudinal side of the secondary storage tank or sub-hopper at which one or more sensors do not detect the particulate material. However, after a certain time duration, if the same sensors still do not detect particulate material, the controller may switch to a different operating mode (e.g., the symmetric leveling mode). In this manner, the method 248 causes the controller to select an operating mode of the agitating system based on the functional status of each sensor, the detection status of each sensor, and the position of each sensor within the agricultural system.

At block 250, the functional status of one sensor is non-functioning, while the detection status of the remaining sensors is positive. As a result, the controller operates the agitating system in the agitation mode (block 252). Thus, the particulate material sensing and agitation control system does not significantly adjust the level or profile of the particulate material within the secondary storage tank or sub-hopper. For example, if the non-functioning sensor would have detected particulate material, operating the agitating system in any other mode may needlessly move particulate material within the secondary storage tank and/or the sub-hopper.

At block 254, the functional status of one sensor is non-functioning, while the detection status of the remaining sensors is negative. In response, the controller operates the agitating system in the symmetric leveling mode (block 256). If the non-functioning sensor would have detected particulate material (e.g., at block 230 of method 198), the possible operating modes include the slightly biased leveling mode and the symmetric leveling mode. Moreover, if the non-functioning sensor would have detected particulate material (e.g., at block 218 or block 226 of method 198), the possible operating modes include the symmetric leveling mode and the moderately biased leveling mode. As a result, the controller operates the agitating system in the symmetric leveling mode, which is the most conservative operating mode of the possible operating modes.

At block 258, the functional status of the middle sensor is non-functioning, while the detection status of one outermost sensor is positive and the detection status of the other outermost sensor is negative. In response, the controller may operate the agitating system in the slightly biased leveling mode (block 260). Regardless of whether the profile of the particulate material would have caused the middle sensor to detect the particulate material, the profile of the particulate material is skewed toward one longitudinal side of the secondary storage tank and/or sub-hopper. As such, the controller may operate the agitating system to move particulate material toward the secondary storage tank and/or sub-hopper. However, to avoid moving too much particulate material and/or moving particulate material too quickly, the controller may operate the agitating system in the slightly biased leveling mode.

At block 262, the functional status of one of the outmost sensors is non-functioning, and the detection status of the remaining sensors alternate between positive and negative. In response, the controller is configured to operate the agitating system in the symmetric leveling mode (block 264). Accordingly, the agitating system avoids moving particulate material toward a particular side of the secondary storage tank and/or sub-hopper, and the agitating system still moves a portion of the particulate material to level the profile of the particulate material.

At block 266, the functional status of more than one sensor is non-functioning. In response, at block 268, the controller operates the agitating system in the agitation mode. That is, since more than one sensor is not functioning, the controller may not be able to determine details of the profile. As such, the controller may operate the agitating system to avoid changing the profile of the particulate material.

FIG. 11 is a flowchart of an embodiment of a method 280 to control a particulate material sensing and agitation control system to operate in a door-dump mode. As illustrated in FIG. 11, the particulate material sensing and agitation control system is configured to operate in the door-dump mode while the particulate material is not metered. However, in some embodiments, the particulate material sensing and agitation control system is configured to operate the door-dump mode while the particulate material is metered. At block 200, the controller determines the status of the metering system. If the status of metering system is inactive, as shown at block 282, particulate material may not be metered through the agricultural system. In response, the controller may determine if a door-dump switch of the agricultural system is activated (block 284). If the status of the metering system is active, the controller may not determine if the door-dump switch is activated, and, therefore, the controller may not operate the agitation system in the door-dump mode while the metering system is active. In some embodiments, the door-dump switch may be a device (e.g., lever switch, pushbutton) that may be manually activated or deactivated by the operator. In additional or alternative embodiments, the door-dump switch may be a setting adjustable by the controller and/or by the operator (e.g., via the user interface).

At block 286, the controller determines the door-dump switch is not activated. For example, operation of the agricultural system may be suspended. If the controller determines the door-dump switch is not activated, at block 288, the controller may not operate the door-dump mode.

At block 290, the controller determines the door-dump switch is activated and thus, the controller may proceed to determine a door-dump time duration in which to operate the agitating system in the door-dump mode. In certain embodiments, the controller may also determine if the drive system is energized. That is, the controller may determine if the drive system is currently moving (e.g., rotating) the agitator. In some cases, the controller may de-energize or suspend operation of the drive system such that the agitator is no longer moving prior to determining the door-dump time duration in which to operate the agitating system.

At block 300, the controller determines if any sensors detect particulate material. In other words, the controller determines if any particulate material may remain in the secondary storage tank. If the controller determines that more than one sensor detects particulate material, as shown at block 302, the controller may operate the door-dump mode at a fraction of the preset door-dump time. In certain embodiments, the controller may operate the agitating system in the door-dump mode for ⅛ of the preset door-dump time (block 304), such as 5 seconds to 25 seconds. In certain embodiments, the controller may be configured to operate the agitating system in the door-dump mode for a fraction of the preset door-dump time based on the number of sensors that detect particulate material. As an example, if the controller determines that two sensors detect particulate material, the controller may operate the agitating system in the door-dump mode for to ⅕ to ¼ of the preset door-dump time. In another example, if the controller determines that three sensors detect particulate material, the controller may operate the agitating system in the door-dump mode for 1/10 to ⅕ of the preset door-dump time.

At block 306, the controller determines that one sensor at most detects particulate material. As a result, the controller may determine if any of the sensors are non-functioning (block 308). At block 310, the controller determines that at least one of the sensors are non-functioning. Thus, the controller may operate the agitating system in the door-dump mode for a different fraction of the preset door-dump time (block 312). In particular embodiments, the controller may operate the agitating system in the door-dump mode for a time duration greater than the time duration at block 304 for determining that more than one sensor detects particulate material, but the time duration may still be less than the entire preset door-dump time. For example, the controller may operate the agitating system in the door-dump mode for ½ of the preset door-dump time, such as 20 seconds to 100 seconds. In additional or alternative embodiments, the controller may be configured to operate the agitating system in the door-dump mode for a time duration based on the number of sensors that are non-functioning. By way of example, if the controller determines one sensor is non-functioning, the controller may operate the door-dump mode for ¾ to ⅘ of the preset door-dump time. However, if the controller determines two sensors are non-functioning, the controller may operate the door-dump mode for ½ to ⅗ of the preset door-dump time.

At block 314, the controller determines that none of the sensors are non-functioning. That is, the controller may have positively determined that little or no particulate material remains in the secondary storage tank. For this reason, the controller may operate the agitating system for the entire preset door-dump time, which may be 40 seconds to 200 seconds (block 316). Accordingly, the controller enables the loaded particulate material to be distributed across the secondary storage tank and/or the sub-hopper.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A particulate material sensing and agitation control system of an agricultural system, comprising:
a drive system configured to operate an agitating system, wherein the agitating system comprises an agitator; and
a controller comprising a memory and a processor, wherein the controller is configured to:
receive at least one sensor signal indicative of a profile of a particulate material within the agricultural system; and
output a control signal to instruct the drive system to operate the agitating system in a selected operating mode of a plurality of operating modes based on the profile of the particulate material, wherein the agitating system is configured to interact with the particulate material in each operating mode of the plurality of operating modes, the plurality of operating modes comprises an agitation mode and a leveling mode, and the drive system is configured to cyclically rotate the agitator in a first rotational direction for a first time and in a second rotational direction, opposite the first rotational direction, for a second time while the agitating system is operating in each operating mode of the plurality of operating modes.

2. The particulate material sensing and agitation control system of claim 1, wherein the leveling mode comprises a symmetric leveling mode, a heavily biased leveling mode, a moderately biased leveling mode, a slightly biased leveling mode, or any combination thereof.

3. The particulate material sensing and agitation control system of claim 2, wherein the drive system is configured to cyclically rotate the agitator in the first rotational direction for the first time, maintain a position of the agitator for a first dwell time, rotate the agitator in the second rotational direction for the second time, and maintain another position of the agitator for a second dwell time while the agitating system is operating in each operating mode of the plurality of operating modes.

4. The particulate material sensing and agitation control system of claim 3, wherein the agitation mode comprises an approximately equal first time and second time, the symmetric leveling mode comprises an approximately equal first time and second time, the heavily biased leveling mode comprises a first difference between the first time and the second time of 23 seconds to 57 seconds, the moderately biased leveling mode comprises a second difference between the first time and the second time of 5 seconds to 27 seconds, and the slightly biased leveling mode comprises a third difference between the first time and the second time of 1 second to 4 seconds.

5. The particulate material sensing and agitation control system of claim 1, wherein the controller is configured to determine whether a metering system of the agricultural system is active, and, in response to determining the metering system is active, the controller is configured to output the control signal to instruct the drive system to operate the agitating system in the selected operating mode of the plurality of operating modes.

6. The particulate material sensing and agitation control system of claim 5, wherein, in response to determining the metering system is not active, the controller is configured to output an additional signal to instruct the drive system to operate the agitating system in a door-dump mode.

7. The particulate material sensing and agitation control system of claim 6, wherein the additional signal instructs the drive system to operate the agitating system in the door-dump mode for a time duration based on the profile of the particulate material.

8. At least one non-transitory computer readable medium comprising executable instructions that, when executed by a processor, are configured to cause the processor to:
receive at least one sensor signal from a plurality of sensors, wherein the at least one sensor signal is indicative of a profile of a particulate material within an agricultural system; and
output a control signal to instruct a drive system of the agricultural system to operate an agitating system in a selected operating mode of a plurality of operating modes based on the profile of the particulate material, wherein the agitating system is configured to interact with the particulate material in each operating mode of the plurality of operating modes, the agitating system comprises an agitator, and the control signal instructs the drive system to operate the agitating system to cyclically rotate the agitator in a first rotational direction for a first time and in a second rotational direction, opposite the first rotational direction, for a second time while the agitating system is operating in each operating mode of the plurality of operating modes.

9. The at least one non-transitory computer readable medium of claim 8, wherein the executable instructions are configured to cause the processor to select an agitation mode as the selected operating mode in response to receiving the at least one sensor signal indicating that each sensor of the plurality of sensors detects the particulate material.

10. The at least one non-transitory computer readable medium of claim 8, wherein the executable instructions are configured to cause the processor to select a symmetric operating mode as the selected operating mode in response to receiving the at least one sensor signal indicating that outermost sensors of the plurality of sensors detect the particulate material and a middle sensor of the plurality of sensors does not detect the particulate material, or that the outermost sensors do not detect the particulate material and the middle sensor detects the particulate material.

11. The at least one non-transitory computer readable medium of claim 8, wherein the executable instructions are configured to cause the processor to select a heavily biased operating mode as the selected operating mode in response to receiving the at least one sensor signal indicating that a middle sensor detects the particulate material, that one or more sensors of a first side of the middle sensor detect the particulate material, and that one or more sensors of a second side of the middle sensor do not detect the particulate material.

12. The at least one non-transitory computer readable medium of claim 8, wherein the executable instructions are configured to cause the processor to select a moderately biased operating mode as the selected operating mode in response to receiving the at least one sensor signal indicating that a middle sensor does not detect the particulate material, that one or more sensors of a first side of the middle sensor detect the particulate material, and that one or more sensors of a second side of the middle sensor do not detect the particulate material.

13. The at least one non-transitory computer readable medium of claim 8, wherein the executable instructions are configured to cause the processor to determine whether a previous selected operating mode is a moderately biased leveling mode in response to receiving the at least one sensor signal indicating that none of the sensors of the plurality of sensors detect the particulate material, and the executable instructions are configured to cause the processor to select a slightly biased leveling mode as the selected operating mode in response to determining the previous selected operating mode is the moderately biased leveling mode.

14. The at least one non-transitory computer readable medium of claim 13, wherein the executable instructions are configured to cause the processor to select a symmetric leveling mode as the selected operating mode in response to determining that the previous operating mode of the agitating system is not the moderately biased leveling mode.

15. A particulate material sensing and agitation control system of an agricultural system, comprising:
a drive system configured to operate an agitating system comprising an agitator;
a plurality of sensors, wherein each sensor of the plurality of sensors is configured to detect presence of particulate material in a section of a storage tank of the agricultural system; and
a controller comprising a memory and a processor, wherein the controller is configured to:
receive at least one sensor signal from the plurality of sensors, wherein the at least one sensor signal is indicative of a profile of the particulate material within the storage tank; and output a control signal to instruct the drive system to operate the agitating system in a selected operating mode of a plurality of operating modes based on the profile of the particulate material, wherein the agitating system is configured to interact with the particulate material in each operating mode of the plurality of operating modes, the plurality of operating modes comprises an agitation mode and a leveling mode, and the drive system is configured to cyclically rotate the agitator in a first rotational direction for a first time and in a second rotational direction, opposite the first rotational direction, for a second time while the agitating system is operating in each operating mode of the plurality of operating modes.

16. The particulate material sensing and agitation control system of claim 15, wherein the leveling mode comprises a symmetric leveling mode, a heavily biased leveling mode, a moderately biased leveling mode, a slightly biased leveling mode, or any combination thereof.

17. The particulate material sensing and agitation control system of claim 16, wherein the drive system is configured to cyclically rotate the agitator in the first rotational direction for the first time, maintain a position of the agitator for a first dwell time, rotate the agitator in the second rotational direction for the second time, and maintain another position of the agitator for a second dwell time while the agitating system is operating in each operating mode of the plurality of operating modes.

18. The particulate material sensing and agitation control system of claim 17, wherein the agitation mode comprises an approximately equal first time and second time, the symmetric leveling mode comprises an approximately equal first time and second time, the heavily biased leveling mode comprises a first difference between the first time and the second time, the moderately biased leveling mode comprises a second difference between the first time and the second time, and the slightly biased leveling mode comprises a third difference between the first time and the second time, wherein the first difference is greater than the second difference, and the second difference is greater than the third difference.

19. The particulate material sensing and agitation control system of claim 17, wherein the agitation mode comprises an approximately equal first time and second time, and the symmetric leveling mode comprises another approximately equal first time and second time, wherein the first time and the second time of the agitation mode are each greater than the first time and the second time of the symmetric leveling mode.

20. The particulate material sensing and agitation control system of claim 17, wherein the respective first dwell times and second dwell times of the symmetric leveling mode, the heavily biased leveling mode, the moderately biased leveling mode, and the slightly biased leveling mode each comprise approximately the same leveling dwell time, and the first dwell time and the second dwell time of the agitation mode each comprise approximately the same agitation dwell time, wherein the agitation dwell time is greater than the leveling dwell time.

* * * * *